US012711492B2

(12) United States Patent
Pearce et al.

(10) Patent No.: US 12,711,492 B2
(45) **Date of Patent: *Aug. 18, 2026**

(54) ACCESS CONTROL TOWER

(71) Applicant: Wells Fargo Bank, N.A., San Francisco, CA (US)

(72) Inventors: Brian M. Pearce, Pleasanton, CA (US); Benjamin Soccorsy, Larkspur, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/018,797

(22) Filed: Jan. 13, 2025

(65) Prior Publication Data

US 2025/0148455 A1 May 8, 2025

Related U.S. Application Data

(63) Continuation of application No. 18/126,773, filed on Mar. 27, 2023, now Pat. No. 12,198,130, which is a (Continued)

(51) Int. Cl.
*G06Q 20/36* (2012.01)
*H04L 9/40* (2022.01)

(52) U.S. Cl.
CPC ....... *G06Q 20/3674* (2013.01); *H04L 63/083* (2013.01)

(58) Field of Classification Search
None
See application file for complete search history.

(56) References Cited

U.S. PATENT DOCUMENTS 2,751,554 A 6/1956 Schlesinger et al.
5,485,510 A 1/1996 Colbert
(Continued)

FOREIGN PATENT DOCUMENTS

AU 2006335151 A1 7/2007
AU 2006227177 A1 10/2007
(Continued)

OTHER PUBLICATIONS

Payment Device Management, Fraud Prevention, and Risk Mitigation, an IP.com Pn'orArt Database Technical Disclosure, https://priorart.ip.com/IPCOM/000232299 (Year: 2013).
(Continued)

*Primary Examiner* — Jamie R Kucab
(74) *Attorney, Agent, or Firm* — Foley & Lardner LLP

(57) ABSTRACT

Systems, methods, and apparatuses for providing a customer a central location to manage permissions provided to third-parties and devices to access and use customer information maintained by a financial institution are described. The central location serves as a central portal where a customer of the financial institution can manage all access to account information and personal information stored at the financial institution. Accordingly, the customer does not need to log into each individual third-party system or customer device to manage previously provided access to the customer information or to provision new access to the customer information.

20 Claims, 5 Drawing Sheets

Related U.S. Application Data continuation of application No. 15/629,423, filed on Jun. 21, 2017, now Pat. No. 11,615,402.

(60) Provisional application No. 62/357,737, filed on Jul. 1, 2016.

(56) References Cited

U.S. PATENT DOCUMENTS 5,573,457 A 11/1996 Watts et al.
5,737,423 A 4/1998 Manduley
5,953,710 A 9/1999 Fleming
5,999,978 A 12/1999 Angal et al.
6,047,268 A 4/2000 Bartoli et al.
6,105,006 A 8/2000 Davis et al.
6,188,309 B1 2/2001 Levine
6,193,152 B1 2/2001 Fernando et al.
6,408,330 B1 6/2002 Delahuerga
6,422,462 B1 7/2002 Cohen
6,494,367 B1 12/2002 Zacharias
6,575,361 B1 6/2003 Graves et al.
6,717,592 B2 4/2004 Gusler et al.
6,845,906 B2 1/2005 Royer et al.
6,865,547 B1 3/2005 Brake et al.
6,879,965 B2 4/2005 Fung et al.
6,910,021 B2 6/2005 Brown et al.
6,931,382 B2 8/2005 Laage et al.
6,980,969 B1 12/2005 Tuchler et al.
7,014,107 B2 3/2006 Singer et al.
7,016,877 B1 3/2006 Steele et al.
7,107,243 B1 9/2006 Mcdonald et al.
7,155,411 B1 12/2006 Blinn et al.
7,219,833 B2 5/2007 Cantini et al.
7,225,156 B2 5/2007 Fisher et al.
7,249,099 B2 7/2007 Ling
7,264,154 B2 9/2007 Harris
7,319,986 B2 1/2008 Praisner et al.
7,331,518 B2 2/2008 Rable
7,347,361 B2 3/2008 Lovett
7,359,880 B2 4/2008 Abel et al.
7,383,988 B2 6/2008 Slonecker, Jr.
7,383,998 B2 6/2008 Parker et al.
7,392,224 B1 6/2008 Bauer et al.
7,398,248 B2 7/2008 Phillips et al.
7,401,731 B1 7/2008 Pletz et al.
7,413,113 B1 8/2008 Zhu
7,451,395 B2 11/2008 Brants et al.
7,512,563 B2 3/2009 Likourezos et al.
7,552,088 B2 6/2009 Malcolm
7,571,142 B1 8/2009 Flitcroft et al.
7,587,365 B2 9/2009 Malik et al.
7,594,258 B2 9/2009 Mao et al.
7,653,597 B1 1/2010 Stevanovski et al.
7,685,037 B2 3/2010 Reiners et al.
7,689,502 B2 3/2010 Lilly et al.
7,698,221 B2 4/2010 Blinn et al.
7,707,082 B1 4/2010 Lapstun et al.
7,712,655 B2 5/2010 Wong
7,740,170 B2 6/2010 Singh et al.
7,753,265 B2 7/2010 Harris
7,778,932 B2 8/2010 Yan
7,818,319 B2 10/2010 Henkin et al.
7,857,212 B1 12/2010 Matthews
7,873,573 B2 1/2011 Realini
7,930,228 B1 4/2011 Hawkins et al.
7,937,325 B2 5/2011 Kumar et al.
7,941,534 B2 5/2011 De La Huerga
7,949,572 B2 5/2011 Perrochon et al.
7,954,704 B1 6/2011 Gephart et al.
7,962,418 B1 6/2011 Wei et al.
8,090,346 B2 1/2012 Cai
8,099,109 B2 1/2012 Altman et al.
8,127,982 B1 3/2012 Casey et al.
8,160,933 B2 4/2012 Nguyen et al.
8,175,938 B2 5/2012 Olliphant et al.
8,196,131 B1 6/2012 Von Behren et al.
8,245,909 B2 8/2012 Pletz et al.
8,249,983 B2 8/2012 Dilip et al.
8,255,323 B1 8/2012 Casey et al.
8,266,031 B2 9/2012 Norris et al.
8,266,205 B2 9/2012 Hammad et al.
8,280,786 B1 10/2012 Weiss et al.
8,280,788 B2 10/2012 Perlman
8,296,228 B1 10/2012 Kloor
8,297,502 B1 10/2012 Mcghie et al.
8,301,566 B2 10/2012 Mears
8,332,294 B1 12/2012 Thearling
8,359,531 B2 1/2013 Grandison et al.
8,360,952 B2 1/2013 Wissman et al.
8,364,556 B2 1/2013 Nguyen et al.
8,396,808 B2 3/2013 Greenspan
8,407,136 B2 3/2013 Bard et al.
8,407,142 B1 3/2013 Griggs
8,423,349 B1 4/2013 Huynh et al.
8,473,394 B2 6/2013 Marshall
8,489,761 B2 7/2013 Pope et al.
8,489,894 B2 7/2013 Comrie et al.
8,543,506 B2 9/2013 Grandcolas et al.
8,565,723 B2 10/2013 Cox
8,589,335 B2 11/2013 Smith et al.
8,595,074 B2 11/2013 Sharma et al.
8,595,098 B2 11/2013 Starai et al.
8,625,838 B2 1/2014 Song et al.
8,630,952 B2 1/2014 Menon
8,635,687 B2 1/2014 Binder
8,639,629 B1 1/2014 Hoffman
8,655,310 B1 2/2014 Katzer et al.
8,655,719 B1 2/2014 Li et al.
8,660,926 B1 2/2014 Wehunt et al.
8,666,411 B2 3/2014 Tokgoz et al.
8,682,753 B2 3/2014 Kulathungam
8,682,802 B1 3/2014 Kannanari
8,700,729 B2 4/2014 Dua
8,706,625 B2 4/2014 Vicente et al.
8,712,839 B2 4/2014 Steinert et al.
8,725,601 B2 5/2014 Ledbetter et al.
8,737,964 B2 5/2014 Koraichi
8,762,211 B2 6/2014 Killian et al.
8,762,237 B2 6/2014 Monasterio et al.
8,768,838 B1 7/2014 Hoffman
8,781,882 B1 7/2014 Arboletti et al.
8,781,957 B2 7/2014 Jackson et al.
8,781,963 B1 7/2014 Feng et al.
8,793,190 B2 7/2014 Johns et al.
8,794,972 B2 8/2014 Lopucki
8,851,369 B2 10/2014 Bishop et al.
8,868,458 B1 10/2014 Starbuck et al.
8,868,666 B1 10/2014 Hellwege et al.
8,880,047 B2 11/2014 Konicek et al.
8,887,997 B2 11/2014 Barret et al.
8,910,304 B2 12/2014 Tsujimoto
8,918,338 B1 12/2014 Bornhofen et al.
8,924,269 B1 12/2014 Seubert et al.
8,924,288 B1 12/2014 Easley et al.
8,925,099 B1 12/2014 Saxe et al.
8,954,839 B2 2/2015 Sharma et al.
9,043,609 B2 5/2015 Calman
9,076,134 B2 7/2015 Grovit et al.
9,105,021 B2 8/2015 Tobin
9,195,984 B1 11/2015 Spector et al.
9,256,871 B2 2/2016 Anderson et al.
9,256,904 B1 2/2016 Haller et al.
9,305,155 B1 * 4/2016 Vo .......................... G06F 3/0482
9,351,193 B2 5/2016 Raleigh et al.
9,372,849 B2 6/2016 Gluck et al.
9,390,417 B2 7/2016 Song et al.
9,396,491 B2 7/2016 Isaacson et al.
9,444,824 B1 9/2016 Balazs et al.
9,489,694 B2 11/2016 Haller et al.
9,514,456 B2 12/2016 England et al.
9,519,934 B2 12/2016 Calman et al.
9,524,525 B2 12/2016 Manyam et al.
9,558,478 B2 1/2017 Zhao
9,569,473 B1 2/2017 Holenstein et al.
9,569,766 B2 2/2017 Kneen

(56) References Cited

U.S. PATENT DOCUMENTS 9,576,318 B2 2/2017 Caldwell
9,646,300 B1 5/2017 Zhou et al.
9,647,855 B2 5/2017 Deibert et al.
9,690,621 B2 6/2017 Kim et al.
9,699,610 B1 7/2017 Chicoine et al.
9,710,566 B2 7/2017 Ainslie et al.
9,740,543 B1 8/2017 Savage et al.
9,760,871 B1 9/2017 Pourfallah et al.
9,775,029 B2 9/2017 Lopez
9,792,636 B2 * 10/2017 Milne .................. G06Q 20/384
9,792,648 B1 10/2017 Haller et al.
9,849,364 B2 12/2017 Tran et al.
9,852,484 B1 12/2017 Fonts et al.
9,853,959 B1 12/2017 Kapczynski et al.
9,858,405 B2 1/2018 Ranadive et al.
9,858,576 B2 1/2018 Song et al.
9,978,046 B2 5/2018 Lefebvre et al.
9,996,837 B2 6/2018 Siddens et al.
10,032,146 B2 7/2018 Caldwell
10,044,501 B1 8/2018 Bradley et al.
10,044,647 B1 8/2018 Karp et al.
10,050,779 B2 8/2018 Alness et al.
10,055,747 B1 8/2018 Sherman et al.
10,096,006 B2 10/2018 Loevenguth et al.
10,096,043 B2 10/2018 Beck et al.
10,097,356 B2 10/2018 Zinder
10,115,155 B1 10/2018 Haller et al.
10,152,756 B2 12/2018 Isaacson et al.
10,157,420 B2 12/2018 Narayana et al.
10,187,483 B2 * 1/2019 Golub ..................... H04L 67/53
10,204,327 B2 2/2019 Katzin et al.
10,216,548 B1 2/2019 Zhang et al.
10,250,453 B1 4/2019 Singh et al.
10,275,602 B2 4/2019 Bjorn et al.
10,282,741 B2 5/2019 Yu et al.
10,332,088 B2 6/2019 Groarke
10,359,915 B2 7/2019 Asai
10,373,129 B1 8/2019 James et al.
10,402,817 B1 9/2019 Benkreira et al.
10,402,818 B2 9/2019 Zarakas et al.
10,417,396 B2 9/2019 Bawa et al.
10,423,948 B1 9/2019 Wilson et al.
10,438,290 B1 10/2019 Winklevoss et al.
10,445,152 B1 10/2019 Zhang et al.
10,445,725 B2 10/2019 Tietzen
10,460,395 B2 10/2019 Grassadonia
10,521,798 B2 12/2019 Song et al.
10,592,882 B1 3/2020 Viswanath et al.
10,614,478 B1 4/2020 Georgi
10,621,587 B2 4/2020 Binns et al.
10,650,448 B1 5/2020 Haller et al.
10,657,503 B1 5/2020 Ebersole et al.
10,673,862 B1 6/2020 Threlkeld
10,742,655 B2 8/2020 Taylor et al.
10,762,478 B1 9/2020 Maeng
10,825,028 B1 11/2020 Kramme et al.
10,867,298 B1 12/2020 Duke et al.
10,872,005 B1 12/2020 Killis
10,878,496 B1 12/2020 Duong et al.
10,936,711 B2 3/2021 Jain et al.
10,963,589 B1 3/2021 Fakhraie et al.
10,984,482 B1 4/2021 Thangarajah et al.
10,992,679 B1 4/2021 Fakhraie et al.
11,107,561 B2 8/2021 Matthieu et al.
11,144,903 B2 10/2021 Ready et al.
11,151,529 B1 10/2021 Nolte et al.
11,188,919 B1 11/2021 Ho
11,200,569 B1 12/2021 James et al.
11,227,064 B1 1/2022 Fakhraie et al.
11,386,223 B1 7/2022 Fakhraie et al.
11,507,935 B1 11/2022 Ellis et al.
11,836,727 B1 12/2023 Parekh et al.
2001/0001856 A1 5/2001 Gould et al.
2001/0032183 A1 10/2001 Landry
2001/0051920 A1 12/2001 Joao et al.
2001/0056398 A1 12/2001 Scheirer
2002/0010679 A1 1/2002 Felsher
2002/0016749 A1 2/2002 Borecki et al.
2002/0035539 A1 3/2002 O'Connell
2002/0038289 A1 3/2002 Lawlor et al.
2002/0062249 A1 5/2002 Iannacci
2002/0095386 A1 7/2002 Maritzen et al.
2002/0120582 A1 8/2002 Elston et al.
2002/0143655 A1 10/2002 Elston et al.
2002/0169720 A1 11/2002 Wilson et al.
2003/0046246 A1 3/2003 Klumpp et al.
2003/0055786 A1 3/2003 Smith et al.
2003/0061163 A1 3/2003 Durfield
2003/0097331 A1 5/2003 Cohen
2003/0172040 A1 9/2003 Kemper et al.
2003/0195847 A1 10/2003 Felger
2003/0200179 A1 10/2003 Kwan
2003/0216997 A1 11/2003 Cohen
2003/0217001 A1 11/2003 Mcquaide et al.
2004/0054564 A1 3/2004 Fonseca et al.
2004/0054591 A1 3/2004 Spaeth et al.
2004/0073903 A1 4/2004 Melchione et al.
2004/0078325 A1 4/2004 O'Connor
2004/0090825 A1 5/2004 Nam et al.
2004/0128243 A1 7/2004 Kavanagh et al.
2004/0143632 A1 7/2004 Mccarty
2004/0148259 A1 7/2004 Reiners et al.
2004/0178907 A1 9/2004 Cordoba
2004/0225606 A1 11/2004 Nguyen et al.
2004/0249710 A1 12/2004 Smith et al.
2004/0249753 A1 12/2004 Blinn et al.
2004/0263901 A1 12/2004 Critelli et al.
2005/0010483 A1 1/2005 Ling
2005/0014705 A1 1/2005 Cheng et al.
2005/0027431 A1 2/2005 Todoroki et al.
2005/0027651 A1 2/2005 Devault
2005/0039041 A1 2/2005 Shaw et al.
2005/0060233 A1 3/2005 Bonalle et al.
2005/0114705 A1 5/2005 Reshef et al.
2005/0131815 A1 6/2005 Fung et al.
2005/0160038 A1 7/2005 Albornoz
2005/0171898 A1 * 8/2005 Bishop ................ G06Q 20/327
705/39
2005/0199714 A1 9/2005 Brandt et al.
2005/0205662 A1 9/2005 Nelson
2005/0224587 A1 10/2005 Shin et al.
2005/0228750 A1 10/2005 Olliphant et al.
2005/0273431 A1 12/2005 Abel et al.
2006/0046742 A1 3/2006 Zhang
2006/0046745 A1 3/2006 Davidson
2006/0059110 A1 3/2006 Madhok et al.
2006/0178986 A1 8/2006 Giordano et al.
2006/0184456 A1 8/2006 De Janasz
2006/0190374 A1 8/2006 Sher
2006/0202012 A1 9/2006 Grano et al.
2006/0206912 A1 9/2006 Klarfeld et al.
2006/0211493 A1 9/2006 Walker et al.
2006/0235795 A1 10/2006 Johnson et al.
2006/0278698 A1 12/2006 Lovett
2007/0051797 A1 3/2007 Randolph-Wall et al.
2007/0083459 A1 4/2007 Eubanks
2007/0083463 A1 4/2007 Kraft
2007/0100773 A1 5/2007 Wallach
2007/0112673 A1 5/2007 Protti
2007/0123305 A1 5/2007 Chen et al.
2007/0143831 A1 6/2007 Pearson et al.
2007/0203836 A1 8/2007 Dodin
2007/0214030 A1 9/2007 Shear et al.
2007/0226086 A1 9/2007 Bauman et al.
2007/0255653 A1 11/2007 Tumminaro et al.
2007/0266257 A1 11/2007 Camaisa et al.
2008/0000052 A1 1/2008 Hong et al.
2008/0005037 A1 1/2008 Hammad et al.
2008/0017702 A1 1/2008 Little et al.
2008/0021787 A1 1/2008 Mackouse
2008/0029608 A1 2/2008 Kellum et al.
2008/0052226 A1 2/2008 Agarwal et al.
2008/0066185 A1 3/2008 Lester et al.
2008/0086398 A1 4/2008 Parlotto

(56) References Cited

U.S. PATENT DOCUMENTS

2008/0115104 A1 5/2008 Quinn
2008/0134347 A1 6/2008 Goyal et al.
2008/0149706 A1 6/2008 Brown et al.
2008/0154772 A1 6/2008 Carlson
2008/0170156 A1 7/2008 Kim
2008/0191878 A1 8/2008 Abraham
2008/0208726 A1 8/2008 Tsantes et al.
2008/0226142 A1 9/2008 Pennella et al.
2008/0229383 A1 9/2008 Buss et al.
2008/0244724 A1 10/2008 Choe et al.
2008/0260119 A1 10/2008 Marathe et al.
2008/0275748 A1 11/2008 John
2008/0283590 A1 11/2008 Oder et al.
2008/0301043 A1 12/2008 Unbehagen
2008/0319889 A1 12/2008 Hammad et al.
2009/0005269 A1 1/2009 Martin et al.
2009/0007231 A1 1/2009 Kaiser et al.
2009/0012898 A1 1/2009 Sharma et al.
2009/0055269 A1 2/2009 Baron
2009/0055642 A1 2/2009 Myers et al.
2009/0089113 A1 4/2009 Rousso et al.
2009/0112763 A1 4/2009 Scipioni et al.
2009/0132351 A1 5/2009 Gibson
2009/0157512 A1 6/2009 King
2009/0164324 A1 6/2009 Bishop et al.
2009/0172587 A1 7/2009 Carlisle et al.
2009/0205014 A1 8/2009 Doman et al.
2009/0228381 A1 9/2009 Mik et al.
2009/0254447 A1 10/2009 Blades
2009/0254971 A1 10/2009 Herz et al.
2009/0287603 A1 11/2009 Lamar et al.
2009/0292599 A1 11/2009 Rampell et al.
2009/0299841 A1 12/2009 Bishop et al.
2009/0319638 A1 12/2009 Faith et al.
2010/0036769 A1 2/2010 Winters et al.
2010/0036906 A1 2/2010 Song et al.
2010/0042453 A1 2/2010 Scaramellino et al.
2010/0044444 A1 2/2010 Jain et al.
2010/0063906 A1 3/2010 Nelsen et al.
2010/0082445 A1 4/2010 Hodge et al.
2010/0082487 A1 4/2010 Nelsen
2010/0094735 A1 4/2010 Reynolds et al.
2010/0100470 A1 4/2010 Buchanan et al.
2010/0114768 A1 5/2010 Duke et al.
2010/0132049 A1* 5/2010 Vernal .................... G06Q 10/00 705/319
2010/0153224 A1 6/2010 Livnat
2010/0199098 A1 8/2010 King
2010/0228671 A1 9/2010 Patterson
2010/0241595 A1 9/2010 Felsher
2010/0274691 A1 10/2010 Hammad et al.
2010/0276484 A1 11/2010 Banerjee et al.
2010/0306078 A1 12/2010 Hwang
2010/0312700 A1 12/2010 Coulter et al.
2010/0327056 A1 12/2010 Yoshikawa et al.
2011/0023129 A1* 1/2011 Vernal .................... H04L 63/20 726/28
2011/0035288 A1 2/2011 Clyne
2011/0035318 A1 2/2011 Hargrove et al.
2011/0035596 A1 2/2011 Attia et al.
2011/0078010 A1 3/2011 Postrel
2011/0106698 A1 5/2011 Isaacson et al.
2011/0162057 A1 6/2011 Gottumukkala et al.
2011/0172837 A1 7/2011 Forbes, Jr.
2011/0176010 A1 7/2011 Houjou et al.
2011/0178929 A1 7/2011 Durkin et al.
2011/0191177 A1 8/2011 Blackhurst et al.
2011/0191239 A1 8/2011 Blackhurst et al.
2011/0196791 A1 8/2011 Dominguez
2011/0202462 A1 8/2011 Keenan
2011/0218849 A1 9/2011 Rutigliano et al.
2011/0247055 A1 10/2011 Guo et al.
2011/0276479 A1 11/2011 Thomas
2011/0307826 A1 12/2011 Rivera et al.
2011/0320246 A1 12/2011 Tietzen et al.
2012/0024946 A1 2/2012 Tullis et al.
2012/0030006 A1 2/2012 Yoder et al.
2012/0030109 A1 2/2012 Dooley Maley et al.
2012/0041881 A1 2/2012 Basu et al.
2012/0046994 A1 2/2012 Reisman
2012/0047072 A1 2/2012 Larkin
2012/0059701 A1 3/2012 Van Der Veen et al.
2012/0095819 A1 4/2012 Li
2012/0096534 A1 4/2012 Boulos et al.
2012/0099780 A1 4/2012 Smith et al.
2012/0101938 A1 4/2012 Kasower
2012/0117467 A1 5/2012 Maloney et al.
2012/0117476 A1 5/2012 Siegrist et al.
2012/0123841 A1 5/2012 Taveau et al.
2012/0123933 A1 5/2012 Abel et al.
2012/0124658 A1 5/2012 Brudnicki et al.
2012/0158590 A1 6/2012 Salonen
2012/0173387 A1 7/2012 Talker et al.
2012/0197691 A1 8/2012 Grigg et al.
2012/0214577 A1 8/2012 Petersen et al.
2012/0227094 A1 9/2012 Begen et al.
2012/0233013 A1 9/2012 Smith
2012/0239417 A1 9/2012 Pourfallah et al.
2012/0239479 A1 9/2012 Amaro et al.
2012/0239670 A1 9/2012 Horn et al.
2012/0240235 A1 9/2012 Moore
2012/0246122 A1 9/2012 Short et al.
2012/0253852 A1 10/2012 Pourfallah et al.
2012/0254038 A1 10/2012 Mullen
2012/0259782 A1 10/2012 Hammad
2012/0265682 A1 10/2012 Menon
2012/0265685 A1 10/2012 Brudnicki et al.
2012/0270522 A1 10/2012 Laudermilch et al.
2012/0296725 A1 11/2012 Dessert et al.
2012/0296831 A1 11/2012 Carrott
2012/0310760 A1 12/2012 Phillips et al.
2012/0317036 A1 12/2012 Bower et al.
2013/0006847 A1 1/2013 Hammad et al.
2013/0007849 A1 1/2013 Coulter et al.
2013/0031006 A1 1/2013 Mccullagh et al.
2013/0046607 A1 2/2013 Granville, III
2013/0046690 A1 2/2013 Calman et al.
2013/0055378 A1 2/2013 Chang et al.
2013/0073388 A1 3/2013 Heath
2013/0080219 A1 3/2013 Royyuru et al.
2013/0090998 A1 4/2013 Shimogori
2013/0091452 A1 4/2013 Sorden et al.
2013/0103391 A1 4/2013 Millmore et al.
2013/0117696 A1 5/2013 Robertson et al.
2013/0132854 A1 5/2013 Raleigh et al.
2013/0151405 A1 6/2013 Head et al.
2013/0159178 A1 6/2013 Colon et al.
2013/0166332 A1 6/2013 Hammad
2013/0173402 A1 7/2013 Young et al.
2013/0174244 A1 7/2013 Taveau et al.
2013/0191198 A1 7/2013 Carlson et al.
2013/0191213 A1 7/2013 Beck et al.
2013/0203485 A1 8/2013 Walker et al.
2013/0204894 A1 8/2013 Faith
2013/0212666 A1 8/2013 Mattsson et al.
2013/0218649 A1 8/2013 Beal
2013/0218758 A1 8/2013 Koenigsbrueck et al.
2013/0226813 A1 8/2013 Voltz
2013/0240618 A1 9/2013 Hall
2013/0246258 A1 9/2013 Dessert
2013/0246272 A1 9/2013 Kirsch
2013/0254079 A1 9/2013 Murali
2013/0254115 A1 9/2013 Pasa et al.
2013/0282542 A1 10/2013 White
2013/0297400 A1 11/2013 Nagarajan et al.
2013/0301392 A1 11/2013 Zhao
2013/0317893 A1 11/2013 Nelson et al.
2013/0332256 A1 12/2013 Faith et al.
2013/0339124 A1 12/2013 Postrel
2013/0346302 A1 12/2013 Purves et al.
2013/0346306 A1 12/2013 Kopp
2013/0346310 A1 12/2013 Burger et al.
2014/0006209 A1 1/2014 Groarke
2014/0019352 A1 1/2014 Shrivastava

(56) References Cited

U.S. PATENT DOCUMENTS

2014/0024354 A1 1/2014 Haik et al.
2014/0026193 A1 1/2014 Saxman et al.
2014/0032410 A1 1/2014 Georgiev et al.
2014/0032419 A1 1/2014 Anderson et al.
2014/0032723 A1 1/2014 Nema
2014/0040134 A1 2/2014 Ciurea
2014/0040144 A1 2/2014 Plomske et al.
2014/0046827 A1 2/2014 Hochstatter et al.
2014/0053069 A1 2/2014 Yan
2014/0058912 A1 2/2014 Bajaj
2014/0067503 A1 3/2014 Ebarle Grecsek et al.
2014/0067683 A1 3/2014 Varadarajan
2014/0068030 A1 3/2014 Chambers et al.
2014/0075112 A1 3/2014 Baptist et al.
2014/0076967 A1 3/2014 Pushkin et al.
2014/0081736 A1 3/2014 Blackhurst et al.
2014/0108140 A1 4/2014 Crawford
2014/0108260 A1 4/2014 Poole et al.
2014/0108263 A1 4/2014 Ortiz et al.
2014/0114780 A1 4/2014 Menefee et al.
2014/0114855 A1 4/2014 Bajaj et al.
2014/0122328 A1 5/2014 Grigg
2014/0123312 A1 5/2014 Marcotte
2014/0129306 A1 5/2014 Rappoport et al.
2014/0129357 A1 5/2014 Goodwin
2014/0129448 A1 5/2014 Aiglstorfer
2014/0136419 A1 5/2014 Kiyohara
2014/0143886 A1* 5/2014 Eversoll .................. G06F 21/60 726/27
2014/0149198 A1 5/2014 Kim et al.
2014/0149293 A1 5/2014 Laracey
2014/0149368 A1 5/2014 Lee et al.
2014/0149771 A1 5/2014 Krishna et al.
2014/0162598 A1 6/2014 Villa-Real
2014/0164220 A1 6/2014 Desai et al.
2014/0172576 A1 6/2014 Spears et al.
2014/0172707 A1 6/2014 Kuntagod et al.
2014/0180826 A1 6/2014 Boal
2014/0180854 A1 6/2014 Bryant, II
2014/0198054 A1 7/2014 Sharma et al.
2014/0200957 A1 7/2014 Biggs
2014/0207672 A1 7/2014 Kelley
2014/0236792 A1 8/2014 Pant et al.
2014/0237236 A1 8/2014 Kalinichenko et al.
2014/0248852 A1* 9/2014 Raleigh ............... H04W 12/068 455/566
2014/0250002 A1 9/2014 Isaacson et al.
2014/0258104 A1 9/2014 Harnisch
2014/0258109 A1 9/2014 Jiang et al.
2014/0258110 A1 9/2014 Davis et al.
2014/0278538 A1 9/2014 Smith et al.
2014/0279309 A1 9/2014 Cowen et al.
2014/0279474 A1 9/2014 Evans et al.
2014/0279551 A1 9/2014 Samid
2014/0279559 A1 9/2014 Smith et al.
2014/0282852 A1 9/2014 Vestevich
2014/0297438 A1 10/2014 Dua
2014/0306833 A1 10/2014 Ricci
2014/0324527 A1 10/2014 Kulkarni et al.
2014/0337188 A1 11/2014 Bennett et al.
2014/0337215 A1 11/2014 Howe
2014/0344149 A1 11/2014 Campos
2014/0344153 A1 11/2014 Raj et al.
2014/0344877 A1 11/2014 Ohmata et al.
2014/0357233 A1 12/2014 Maximo et al.
2014/0365291 A1 12/2014 Shvarts
2014/0372308 A1 12/2014 Sheets
2014/0379575 A1 12/2014 Rogan
2015/0019443 A1 1/2015 Sheets et al.
2015/0019944 A1 1/2015 Kalgi
2015/0026026 A1 1/2015 Calman et al.
2015/0026049 A1 1/2015 Theurer et al.
2015/0026057 A1 1/2015 Calman et al.
2015/0032625 A1 1/2015 Dill et al.
2015/0032626 A1 1/2015 Dill et al.
2015/0032627 A1 1/2015 Dill et al.
2015/0039457 A1 2/2015 Jacobs et al.
2015/0039496 A1 2/2015 Shuster
2015/0046338 A1 2/2015 Laxminarayanan et al.
2015/0046339 A1 2/2015 Wong et al.
2015/0066768 A1 3/2015 Williamson et al.
2015/0070132 A1 3/2015 Candelore
2015/0073989 A1 3/2015 Green et al.
2015/0079932 A1 3/2015 Zelinka et al.
2015/0081349 A1 3/2015 Johndrow et al.
2015/0082042 A1 3/2015 Hoornaert et al.
2015/0088633 A1 3/2015 Salmon et al.
2015/0088756 A1 3/2015 Makhotin et al.
2015/0095238 A1 4/2015 Khan et al.
2015/0095999 A1 4/2015 Toth
2015/0096039 A1 4/2015 Mattsson et al.
2015/0100477 A1 4/2015 Salama et al.
2015/0100495 A1 4/2015 Salama et al.
2015/0106239 A1 4/2015 Gaddam et al.
2015/0112870 A1 4/2015 Nagasundaram et al.
2015/0121500 A1 4/2015 Venkatanaranappa et al.
2015/0127524 A1 5/2015 Jacobs et al.
2015/0127547 A1 5/2015 Powell et al.
2015/0128215 A1 5/2015 Son et al.
2015/0132984 A1 5/2015 Kim et al.
2015/0134700 A1 5/2015 Macklem et al.
2015/0142673 A1 5/2015 Nelsen et al.
2015/0149272 A1 5/2015 Salmon et al.
2015/0149357 A1 5/2015 Ioannidis et al.
2015/0154595 A1 6/2015 Collinge et al.
2015/0161643 A1 6/2015 Randell et al.
2015/0178724 A1 6/2015 Ngo et al.
2015/0180836 A1 6/2015 Wong et al.
2015/0186856 A1 7/2015 Weiss et al.
2015/0193639 A1 7/2015 Esposito et al.
2015/0193764 A1 7/2015 Haggerty et al.
2015/0193866 A1 7/2015 Van Heerden et al.
2015/0199679 A1 7/2015 Palanisamy et al.
2015/0199689 A1 7/2015 Kumnick et al.
2015/0200495 A1 7/2015 Yu et al.
2015/0213435 A1 7/2015 Douglas et al.
2015/0220917 A1 8/2015 Aabye et al.
2015/0220958 A1 8/2015 Tietzen et al.
2015/0220999 A1 8/2015 Thornton et al.
2015/0221149 A1 8/2015 Main et al.
2015/0229622 A1 8/2015 Grigg et al.
2015/0242853 A1 8/2015 Powell
2015/0248405 A1 9/2015 Rudich et al.
2015/0254635 A1 9/2015 Bondesen et al.
2015/0254638 A1 9/2015 Bondesen et al.
2015/0254646 A1 9/2015 Harkey et al.
2015/0254647 A1 9/2015 Bondesen et al.
2015/0254655 A1 9/2015 Bondesen et al.
2015/0254656 A1 9/2015 Bondesen et al.
2015/0262182 A1 9/2015 Gervais et al.
2015/0269566 A1 9/2015 Gaddam et al.
2015/0277712 A1 10/2015 Ratcliffe et al.
2015/0286834 A1 10/2015 Ohtani et al.
2015/0287133 A1 10/2015 Marlov et al.
2015/0295906 A1 10/2015 Ufford et al.
2015/0301903 A1 10/2015 Mutha et al.
2015/0312038 A1 10/2015 Palanisamy
2015/0319158 A1 11/2015 Kumnick
2015/0319198 A1 11/2015 Gupta et al.
2015/0324592 A1 11/2015 Dutta
2015/0332067 A1 11/2015 Gorod
2015/0339656 A1 11/2015 Wilson et al.
2015/0339663 A1 11/2015 Lopreiato et al.
2015/0339664 A1 11/2015 Wong et al.
2015/0348083 A1 12/2015 Brill et al.
2015/0358423 A1 12/2015 L'Heureux et al.
2015/0371221 A1 12/2015 Wardman
2015/0371324 A1 12/2015 Kumar
2015/0372999 A1 12/2015 Pi-Sunyer
2015/0379508 A1 12/2015 Van
2016/0004741 A1 1/2016 Johnson et al.
2016/0019536 A1 1/2016 Ortiz et al.
2016/0026997 A1 1/2016 Tsui et al.
2016/0028550 A1 1/2016 Gaddam et al.

(56) References Cited

U.S. PATENT DOCUMENTS

2016/0028735 A1 1/2016 Francis et al.
2016/0034906 A1 2/2016 Stopic et al.
2016/0036790 A1 2/2016 Shastry et al.
2016/0042381 A1 2/2016 Braine et al.
2016/0063497 A1 3/2016 Grant, IV
2016/0065370 A1 3/2016 Le Saint et al.
2016/0078428 A1 3/2016 Moser et al.
2016/0078436 A1 3/2016 Tomasofsky et al.
2016/0080403 A1 3/2016 Cunningham et al.
2016/0086212 A1 3/2016 Tietzen et al.
2016/0086222 A1 3/2016 Kurapati
2016/0092696 A1 3/2016 Guglani et al.
2016/0092870 A1 3/2016 Salama et al.
2016/0092872 A1 3/2016 Prakash et al.
2016/0092874 A1 3/2016 O'Regan et al.
2016/0098577 A1 4/2016 Lacey et al.
2016/0098692 A1 4/2016 Johnson et al.
2016/0104187 A1 4/2016 Tietzen et al.
2016/0109954 A1 4/2016 Harris et al.
2016/0119296 A1 4/2016 Laxminarayanan et al.
2016/0125405 A1 5/2016 Alterman et al.
2016/0125409 A1 5/2016 Meredith et al.
2016/0127892 A1 5/2016 Huang et al.
2016/0132918 A1 5/2016 Thomas
2016/0140221 A1 5/2016 Park et al.
2016/0140541 A1 5/2016 Pearson et al.
2016/0149875 A1 5/2016 Li et al.
2016/0155156 A1 6/2016 Gopal et al.
2016/0171483 A1 6/2016 Luoma et al.
2016/0173483 A1 6/2016 Wong et al.
2016/0180302 A1 6/2016 Bagot, Jr.
2016/0189121 A1 6/2016 Best et al.
2016/0203497 A1 7/2016 Tietzen et al.
2016/0217461 A1 7/2016 Gaddam et al.
2016/0232600 A1 8/2016 Purves
2016/0239437 A1 8/2016 Le et al.
2016/0239835 A1 8/2016 Marsyla
2016/0239840 A1 8/2016 Preibisch
2016/0260084 A1 9/2016 Main et al.
2016/0260176 A1 9/2016 Bernard et al.
2016/0267467 A1 9/2016 Rutherford et al.
2016/0267480 A1 9/2016 Metral
2016/0292673 A1 10/2016 Chandrasekaran
2016/0294879 A1 10/2016 Kirsch
2016/0307229 A1 10/2016 Balasubramanian et al.
2016/0314458 A1* 10/2016 Douglas ............... G06Q 20/321
2016/0321643 A1 11/2016 Beck et al.
2016/0321669 A1 11/2016 Beck et al.
2016/0328522 A1 11/2016 Howley
2016/0328577 A1 11/2016 Howley
2016/0358163 A1 12/2016 Kumar et al.
2016/0371471 A1 12/2016 Patton et al.
2016/0373458 A1 12/2016 Moreton et al.
2016/0379211 A1 12/2016 Hoyos et al.
2017/0004506 A1 1/2017 Steinman et al.
2017/0004590 A1 1/2017 Gluhovsky
2017/0011215 A1* 1/2017 Poiesz ................ G06F 21/6209
2017/0011389 A1 1/2017 Mccandless et al.
2017/0011450 A1 1/2017 Frager et al.
2017/0018029 A1 1/2017 Eiriz et al.
2017/0024393 A1 1/2017 Choksi et al.
2017/0046679 A1 2/2017 Gotlieb et al.
2017/0068954 A1* 3/2017 Hockey ................ H04L 9/3213
2017/0070484 A1 3/2017 Kruse et al.
2017/0078299 A1* 3/2017 Castinado .............. G06F 21/34
2017/0078303 A1 3/2017 Wu
2017/0091759 A1 3/2017 Selfridge et al.
2017/0103388 A1 4/2017 Pillai et al.
2017/0132633 A1 5/2017 Whitehouse
2017/0147631 A1 5/2017 Nair et al.
2017/0161724 A1 6/2017 Lau
2017/0161973 A1 6/2017 Katta et al.
2017/0186057 A1 6/2017 Metnick
2017/0201850 A1 7/2017 Raleigh et al.
2017/0237554 A1 8/2017 Jacobs et al.
2017/0249478 A1 8/2017 Lovin
2017/0278125 A1 9/2017 Tietzen et al.
2017/0344991 A1 11/2017 Mark et al.
2017/0352028 A1 12/2017 Vridhachalam et al.
2017/0359722 A1 12/2017 Folse et al.
2017/0364898 A1 12/2017 Ach et al.
2017/0366348 A1 12/2017 Weimer
2018/0005323 A1 1/2018 Grassadonia
2018/0006821 A1 1/2018 Kinagi
2018/0025145 A1 1/2018 Morgner et al.
2018/0053200 A1 2/2018 Cronin et al.
2018/0075440 A1 3/2018 Beck et al.
2018/0088909 A1 3/2018 Baratta et al.
2018/0096752 A1 4/2018 Ovalle
2018/0114212 A1 4/2018 Beck et al.
2018/0121913 A1 5/2018 Unnerstall et al.
2018/0137560 A1 5/2018 Chopra et al.
2018/0150823 A1 5/2018 Omojola et al.
2018/0158137 A1 6/2018 Tsantes et al.
2018/0165682 A9 6/2018 John
2018/0174148 A1 6/2018 Selvarajan
2018/0247302 A1 8/2018 Armstrong et al.
2018/0254898 A1 9/2018 Sprague et al.
2018/0268382 A1 9/2018 Wasserman
2018/0268408 A1 9/2018 Botros et al.
2018/0270363 A1 9/2018 Guday et al.
2018/0276628 A1 9/2018 Radiotis et al.
2018/0276710 A1 9/2018 Tietzen et al.
2018/0293554 A1 10/2018 Johnson
2018/0331835 A1 11/2018 Jackson
2018/0341932 A1 11/2018 Wildes
2018/0349922 A1 12/2018 Carlson et al.
2018/0357440 A1 12/2018 Brady et al.
2018/0365753 A1 12/2018 Fredrich et al.
2018/0373891 A1* 12/2018 Barday ................... G06F 15/76
2019/0007381 A1 1/2019 Isaacson et al.
2019/0095898 A1 3/2019 Bhatia
2019/0164221 A1 5/2019 Hill et al.
2019/0171831 A1 6/2019 Xin
2019/0197501 A1 6/2019 Senci et al.
2019/0220834 A1 7/2019 Moshal et al.
2019/0228173 A1* 7/2019 Gupta ................. G06F 21/6245
2019/0228428 A1 7/2019 Bruner et al.
2019/0228430 A1 7/2019 Givol et al.
2019/0244214 A1 8/2019 Flores et al.
2019/0295069 A1 9/2019 Pala et al.
2019/0318122 A1* 10/2019 Hockey .............. G06Q 20/3221
2019/0318424 A1 10/2019 Mcwilliams
2019/0325161 A1 10/2019 Zavesky et al.
2019/0332802 A1* 10/2019 Barday ................. G06F 21/552
2019/0333061 A1 10/2019 Jackson et al.
2019/0347442 A1* 11/2019 Marlin .................. G07F 19/206
2019/0354979 A1 11/2019 Crawford
2019/0356641 A1 11/2019 Isaacson et al.
2019/0362069 A1* 11/2019 Park ...................... G06F 16/904
2019/0369845 A1 12/2019 Rucker
2019/0370798 A1 12/2019 Hu et al.
2019/0378182 A1 12/2019 Weinflash et al.
2019/0391980 A1 12/2019 Mundar
2019/0392443 A1 12/2019 Piparsaniya et al.
2020/0005283 A1 1/2020 Zimmerman et al.
2020/0005347 A1 1/2020 Boal
2020/0074552 A1 3/2020 Shier et al.
2020/0076601 A1 3/2020 Tabrizi
2020/0090179 A1 3/2020 Song et al.
2020/0118114 A1 4/2020 Benkreira et al.
2020/0118132 A1 4/2020 Schmidt et al.
2020/0118133 A1 4/2020 Schmidt et al.
2020/0250673 A1 8/2020 Botros et al.
2020/0286057 A1 9/2020 Desai
2020/0286076 A1 9/2020 Zhu et al.
2020/0380514 A1 12/2020 Crofts
2021/0012326 A1 1/2021 Maxwell Zelocchi
2021/0027300 A1 1/2021 Chetia et al.
2021/0035072 A1 2/2021 Awasthi
2021/0124760 A1 4/2021 Klein et al.
2021/0158355 A1 5/2021 Kramme et al.
2021/0201322 A1 7/2021 John
2021/0217002 A1 7/2021 Basu et al.

(56) References Cited

U.S. PATENT DOCUMENTS

| | | | |
|---|---|---|---|
| 2021/0233170 | A1 | 7/2021 | Cadet |
| 2021/0258169 | A1 | 8/2021 | Basu et al. |
| 2021/0303335 | A1 | 9/2021 | Foreman et al. |
| 2021/0350343 | A1 | 11/2021 | Gaur et al. |
| 2021/0350458 | A1 | 11/2021 | Gaur et al. |
| 2022/0029815 | A1 | 1/2022 | Basu et al. |
| 2022/0147226 | A1 | 5/2022 | Chaudhri et al. |
| 2022/0292496 | A1 | 9/2022 | Yan |
| 2022/0294630 | A1 | 9/2022 | Collen |
| 2022/0383325 | A1 | 12/2022 | Hoffman |
| 2023/0036439 | A1 | 2/2023 | Olson et al. |
| 2023/0070625 | A1 | 3/2023 | Gaur et al. |
| 2023/0111668 | A1 | 4/2023 | Metnick et al. |
| 2023/0169553 | A1 | 6/2023 | Bousis |
| 2023/0206329 | A1 | 6/2023 | Cella et al. |
| 2023/0214925 | A1 | 7/2023 | Cella et al. |
| 2023/0316284 | A1 | 10/2023 | Kramme et al. |
| 2024/0054498 | A1 | 2/2024 | Sinha et al. |
| 2024/0265405 | A1 | 8/2024 | Kramme et al. |
| 2026/0080421 | A1 | 3/2026 | Skridaila et al. |

FOREIGN PATENT DOCUMENTS

| | | | |
|---|---|---|---|
| AU | 2011268420 | A1 | 12/2012 |
| AU | 2012220669 | A1 | 5/2013 |
| AU | 2013206449 | A1 | 1/2014 |
| AU | 2015222943 | A1 | 9/2015 |
| AU | 2015255170 | A1 | 11/2015 |
| AU | 2016285320 | A1 | 1/2017 |
| AU | 2015327722 | A1 | 4/2017 |
| CA | 2369296 | A1 | 10/2000 |
| CA | 2600101 | A1 | 2/2008 |
| CA | 2820983 | A1 | 11/2009 |
| CA | 2751554 | A1 | 8/2010 |
| CA | 2736690 | A1 | 10/2011 |
| CA | 3014995 | C | 8/2017 |
| CA | 3119642 | A1 | 1/2022 |
| CN | 1183841 | A | 6/1998 |
| CN | 1353842 | A | 6/2002 |
| CN | 1682222 | A | 10/2005 |
| CN | 101084516 | A | 12/2007 |
| CN | 101303717 | A | 11/2008 |
| CN | 101303717 | B | 11/2008 |
| CN | 101923613 | A | 12/2010 |
| CN | 102346896 | A | 2/2012 |
| CN | 102498497 | A | 6/2012 |
| CN | 102689824 | A | 9/2012 |
| CN | 102804219 | A | 11/2012 |
| CN | 103635920 | A | 3/2014 |
| CN | 103797500 | A | 5/2014 |
| CN | 103843024 | A | 6/2014 |
| CN | 104106276 | B | 10/2014 |
| CN | 102648476 | B | 3/2016 |
| CN | 106537901 | A | 3/2017 |
| CN | 206193906 | U | 5/2017 |
| CN | 107230049 | A | 10/2017 |
| CN | 107230070 | A | 10/2017 |
| CN | 103413231 | B | 11/2017 |
| CN | 103765454 | B | 2/2018 |
| CN | 106803175 | B | 7/2021 |
| DE | 69636466 | T2 | 8/2007 |
| EP | 1 259 947 | A2 | 11/2002 |
| EP | 1 770 628 | A2 | 4/2007 |
| EP | 3 073 670 | B1 | 9/2016 |
| GB | 0 441 156 | A | 1/1936 |
| GB | 2 441 156 | A | 2/2008 |
| JP | 6523272 | B2 | 5/2019 |
| KR | 20040031435 | A | 4/2004 |
| KR | 20160015375 | A | 2/2016 |
| KR | 102158055 | B1 | 9/2020 |
| KR | 20250100759 | A | 7/2025 |
| RU | 2451337 | C2 | 5/2012 |
| RU | 2490713 | C2 | 8/2013 |
| WO | WO-90/13096 | A1 | 11/1990 |
| WO | WO-00/72245 | A1 | 11/2000 |
| WO | WO-03/038551 | A2 | 5/2003 |
| WO | WO-2004/081893 | A1 | 9/2004 |
| WO | WO-2004/090825 | A1 | 10/2004 |
| WO | WO-2005/116886 | A2 | 12/2005 |
| WO | WO-2009/026318 | A2 | 2/2009 |
| WO | WO-2009/151839 | A1 | 12/2009 |
| WO | WO-2011/008815 | A2 | 1/2011 |
| WO | WO-2011/017613 | A2 | 2/2011 |
| WO | WO-2011/053404 | A1 | 5/2011 |
| WO | WO-2012/054148 | A1 | 4/2012 |
| WO | WO-2012/131430 | A1 | 10/2012 |
| WO | WO-2012/150602 | A1 | 11/2012 |
| WO | WO-2013/044175 | A1 | 3/2013 |
| WO | WO-2013/075071 | A1 | 5/2013 |
| WO | WO-2013/082190 | A1 | 6/2013 |
| WO | WO-2015/013548 | A1 | 1/2015 |
| WO | WO-2015/036817 | A1 | 3/2015 |
| WO | WO-2015/103443 | A1 | 7/2015 |
| WO | WO-2015/135131 | A1 | 9/2015 |
| WO | WO-2016/015054 | A1 | 1/2016 |
| WO | WO-2016/025291 | A1 | 2/2016 |
| WO | WO-2017/035399 | A1 | 3/2017 |
| WO | WO-2018/005635 | A1 | 1/2018 |
| WO | WO-2022/154789 | A1 | 7/2022 |

OTHER PUBLICATIONS

Sakharova, I., "Payment card fraud: Challenges and solutions," 2012 IEEE International Conference on Intelligence and Security Informatics, Washington, DC, USA, 2012, pp. 227-234, https://ieeexplore.ieee.org/document/6284315?source=IQplus (Year: 2012).

"Authorize.Net Mobile Application: iOS User Guide," Authorize.Net LLC, Ver. 2.0, Sep. 2015, 26 pages. Accessed at: https://www.authorize.net/content/dam/anet-redesign/documents/iosuserguide.pdf.

"CardValet: Mobile Application Training," Fiserv, Year: 2015, pp. 1-93, Accessed at: https://www.westernbanks.com/media/1664/cardvalet-application.pdf.

"CM/ECF Internet Credit Card Payment Guide", Mar. 16, 2005, 12 pages. Accessed at: https://www.vaeb.uscourts.gov/wordpress/?page_id=340.

"Diversinet Enables New Consumer Mobile Services From Intersections Inc.; MoblSecure Wallet and Vault Helps Identity Management Leader Get Closer to its Customers," PR Newswire, May 30, 2007, 6 pages. Retrieved from https://dialog.proquest.com/professional/docview/450976918?accountid=131444 on Feb. 22, 2023 (Year: 2007).

"Location based bank card fraud prevention using push notification technology," 2015, IP.com No. IPCOM000244440D (8 pages).

"Lost Card", BancFirst, Oct. 28, 2003, 1 page. Accessed at: https://www.bancfirst.com/contact.aspx.

"Lost or Stolen Account Info," SECU, May 20, 2005, 2 pages, Accessed at: https://www.secumd.org/advice-planning/money-and-credit/privacy-fraud-protection/lost-or-stolen-account-info.aspx.

"Lost or Stolen Visa Card," Fort Knox Federal Credit Union, Feb. 1, 2001, 2 pages, Accessed at: http://www.fortknoxfcu.org/loststolen.html.

"Purchasing Charges Ahead;", Electronic Buyers' News: 68, CMP Media, Inc., Jun. 20, 1994, 7 pages. Retrieved from https://dialog.proquest.com/professional/docview/681599288?accountid=131444 on Nov. 13, 2020 (Year: 1994).

"Report Lost or Stolen Cards," Union Bank & Trust, Jul. 10, 2005, 13 pages, Accessed at: http://www.ubt.com/security-fraud/report-lost-or-stolen-cards.

"Reporting Lost or Stolen Card Help," Merrick Bank, Aug. 9, 2004, 1 page, Accessed at: http://www.merrickbank.com/Frequent-Asked-Questions/Report-Stolen-Card.aspx.

"Technologies for Payment Fraud Prevention: EMV, Encryption, and Tokenization," White Paper Smart Card Alliance Payments Council, Oct. 2014, pp. 1-34.

"CardValet Tutorial," PCM Credit Union, Jun. 24, 2015, 13:04, https://www.youtube.com/watch?v=uGPh9Htw0Wc (Year: 2015).

(56) References Cited

OTHER PUBLICATIONS

"How to command your cards with ASB Card Control," ASB, Apr. 20, 2015, 1 page, Accessed at: https://www.youtube.com/watch?v=O1sfxvVUL74.
"Irish Card Shield: How to Control Transaction Types," Notre Dame FCU, Jan. 15, 2016, 0:27, https://youtube.com/watch?v=0eZG1c6Bn38 (Year: 2016).
"Rachna Ahlawat at Co-Op Think—Evolution Sessions from THINK14," Co-Op Think, Dec. 22, 2014, 26:22. https://www.youtube.com/watch?v=yEp-qfZoPhl (Year: 2014).
Austin Telco Federal Credit Union., "Lost or Stolen Cards," Apr. 9, 2004, 6 pages. Accessed at: https://www.atfcu.org/lost-stolen-cards.htm.
Cronian, Darrin., "Credit card companies Freeze Spending whilst Abroad", travel-rants.com, Jun. 9, 2007, 9 pages. Available at: http://www.travel-rants.com/2007/06/09/credit-card-companies-freeze-spending-whilst-abroad/.
Deloitte, et al., "Are Central Bank Digital Currencies (CBDCs) the money of tomorrow?", (Year: 2020), (1-26, pages).
Demiriz et al., "Using Location Aware Business Rules for Preventing Retail Banking Frauds," 2015 First International Conference on Anti-Cybercrime (ICACC), IEEE Xplore, Year: 2015, 6 pages.
Dunman et al., "A Novel and Successful Credit Card Fraud Detection System Implemented in a Turkish Bank," 2013 IEEE 13th International Conference on Data Mining Workshops, Dallas, TX, USA. Retrieved from https://ieeexplore.ieee.org/documenU6753916?source=IQplus.
Eickhoff et al: "Quality through Flow and Immersion: Gamifying Crowdsourced Relevance Assessments" , Proceedings of the 35th international ACM SIGIR conference on Research and development in information retrieval, Aug. 12, 2012. (Year: 2012).
Final Office Action on U.S. Appl. No. 15/629,423 dtd Dec. 29, 2021.
Hinze et al., "Event-Based Applications and Enabling Technologies," https://www.researchgate.net/profile/Annika-Hinze/publication/220796268_Event-based_applications_and_enabling_technologies/Links/0fcfd50b638d9592a1000000/Event-based-applications-and-enabling-technologies.pdf (Year: 2009).
IP.com Search Query; May 5, 2020 (Year: 2020), 15 pages.
Ivatury, G., Mobile Phone Banking and Low-Income Customers, 2006, Retrieved from https://www.cgap.org/sites/default/files/CGAP-Mobile-Phone-Banking-and-Low-Income-Customers-Evidence-from-South-Africa-Jan-2006.pdf.
Konsko, Lindsay., "Credit Card Tokenization: Here's What You Need to Know," Nerdwallet, Year: 2014, 4 pages.
Liu et al "A Survey of Payment Card Industry Data Security Standard," IEEE Communications Surveys & Tutorials, vol. 12, No. 3, Third Quarter 2010, pp. 287-303 (Year: 2010).
Luz et al., "A Mobile NFC Payment Terminal for the Event-Wallet on an Android Smartphone" researchgat.net, (Year: 2012).
Mampaey, M., "Secure remittance transaction to bankless consumers in a fragmented applications market," 2011, in Bell Labs Technical Journal, vol. 16, Issue 2, pp. 219-233.
Marforio et al., "Smartphones as Practical and Secure Location Verification Tokens for Payments," Institute of Information Security ETH Zurich, NDSS 2014, Feb. 2014, 15 pages. (Year: 2014).
Microsoft., "Automatically summarize a document," Year: 2016, 3 pages. Accessed at: https://support.office.com/en-us/article/Automatically-summarize-a-document.
Mount, M., "Bitcoin Off-Chain Transactions: Their Invention and Use," Geo. L. Tech. Rev. 685 (Year: 2020) from Hein Online, Georgetown Law Technology Review, Retrieved on Jan. 13, 2023, (685-698, pages).
Non-Final Office Action on U.S. Appl. No. 17/729,880 dtd Feb. 29, 2024.
NPL Search Terms (Year: 2024).
Park et al., "Leveraging Cellular Infrastructure to Improve Fraud Prevention," 2009 Annual Computer Security Applications Conference, IEEE Xplore, Year: 2009, 10 pages.
Poon et al., "The Bitcoin Lightning Network: Scalable Off-Chain Instant Payments," Retrieved on: Jan. 14, 2016, (59, pages).
RBC Royal Bank., "If Your Card is Lost or Stolen", Oct. 1, 2002, 2 pages. Accessed at: http://www.rblbank.com/pdfs/CreditCard/FAQs.pdf.
Shehnaz. A., "Private partners could help RBI run a digital currency," from https://www.livemint.com/opinion/online-views/private-partners-could-help-rbi-run-a-digital-currency-11627486332080.html, Retrieved on Jul. 29, 2021, (6, pages).
Shiravale et al., "Blockchain Technology: A Novel Approach in Information Security Research," Proceedings of the International Conference on Inventive Computation Technologies, ICICT-2018, IEEE Xplore, (Year: 2018), (587-590, pages).
Singh, Sumanjeet., "Emergence of Payment Systems in the Age of Electronic Commerce: The State of Art," International Conference on Internet, IEEE Xplore, Nov. 1, 2009, 18 pages.
Tene et al., "Big Data for All: Privacy and User Control in the Age of Analytics," Northwestern Journal of technology and Intellectual Property. https://scholarlycommons.law.northwestern.edu/cgi/viewcontent.cgi?article= 1191 &context=njtip (Year: 2013).
Trappey et al., "Patent portfolio analysis of e-payment services using technical ontology roadmaps," 2016 IEEE International Conference on Systems, Man, and Cybernetics (SMC), Budapest, Hungary. Retrieved from https://ieeexplore.ieee.org/documenU7844992?source=IQplus.
Urein et al., "A Breakthrough for Prepaid Payment: End to end token exchange and management using secure SSL channels created by EAP-TLS smart cards," 2011 International Conference on Collaboration Technologies and Systems (CTS) (Year: 2011), 8 pages.
Whitrow et al., "Transaction aggregation as a strategy for credit card fraud detection," Data Mining and Knowledge Discovery (2009), Springer Science + Business Media, LLC, Jul. 30, 2008, pp. 30-55. (Year: 2009).
Yang et al., "Impact of Bitcoin's Distributed Structure on the Construction of the Central Bank's Digital Currency System," Proceedings of the Fourth International Conference on Inventive Systems and Control ICISC 2020, IEEE Xplore, (Year: 2020), (829-832, pages).
Yang Ming-Hour., "Security Enhanced EMV-Based Mobile Payment Protocol," Scientific World Journal, vol. 2014, Article ID 864571, Sep. 15, 2014, 19 pages.
O. Ogundele, P. Zavarsky, R. Ruhl and D. Lindskog, "The Implementation of a Full EMV Smartcard for a Point-of-Sale Transaction and Its Impact on the PCI DSS," International Conference on PSRT and International Conference on Social Computing. https://ieeexplore.ieee.org/document/6406326?source=IQplus (Year: 2012).
R. Laurens and C. C. Zou, "Using Credit/Debit Card Dynamic Soft Descriptor as Fraud Prevention System for Merchant," 2016 IEEE Global Communications Conference (Globecom), Washington, DC. https://ieeexplore.ieee.org/document/7842369?source= IQplus (Year: 2016).
Y. Wang, C. Hahn and K. Sutrave, "Mobile payment security, threats, and challenges," 2016 Second International Conference on Mobile and Secure Services (MobiSecServ), Gainesville, FL, USA, 2016. https://ieeexplore.ieee.org/document/7440226'?source= IQplus (Year: 2016).
Ortiz-Yepes, D., A critical review of the EMV payment tokenisation specification, 2014, Computer Fraud & Security, vol. 2014, Issue 10, Oct. 2014, pp. 5-12.

* cited by examiner

ACCESS CONTROL TOWER

CROSS-REFERENCE TO RELATED APPLICATIONS

This application is a continuation of U.S. patent application Ser. No. 18/126,773 filed Mar. 27, 2023 (now U.S. Pat. No. 12,198,130), which is a continuation of U.S. patent application Ser. No. 15/629,423 filed Jun. 21, 2017 (now U.S. Pat. No. 11,615,402), which claims priority to U.S. Provisional Patent Application No. 62/357,737 filed Jul. 1, 2016, each of which is incorporated herein by reference in its entirety.

TECHNICAL FIELD

Embodiments of the present disclosure relate to systems and methods for managing user data and user preferences across a plurality of platforms.

BACKGROUND

Many customers link information (e.g., account types, account balances, payment account information, etc.) maintained by a financial institution to devices (e.g., in a mobile wallet on a smartphone, wearable devices, Internet of Things devices, etc.) and to third-party systems (e.g., financial health monitoring services, merchant e-commerce systems, social media platforms, mobile wallet systems, etc.). Often, to enable access to the information maintained by the financial institution, the customer provides the third-party login credentials or authorizes the third-party to access the information maintained by the financial institution via an application program interface ("API") offered by the financial institution. The customer may share the information with a plurality of different services. For example, the customer may authorize the financial institution to provide account information to a financial health monitoring service, payment card information to a plurality of different mobile wallet services, payment card information to their favorite retailers, and the like. Once the access is provided, the customer can manage preferences relating to the access at each of the third-party systems (e.g., via a third-party website or smartphone application). However, this process can be cumbersome when the customer has authorized a plurality of third-parties to have access to the information maintained by the financial institution.

SUMMARY

Various example embodiments relate to systems and methods for providing a centralized system for providing, modifying, and revoking third-party access to information maintained by a financial institution. One such example embodiment relates to a method of managing access to customer information associated with a customer of a financial institution. The method includes providing, by a financial institution computing system associated with the financial institution, access to a data control portal to a computing device associated with the customer. The method further includes receiving, by the financial institution computing system and from the computing device, access permissions associated with the customer information that change. The access permissions define how an external device or system can access or utilize the customer information. The method includes implementing, by the financial institution computing system, the access permissions. The method further includes updating, by the financial institution computing system, a user interface of the data control portal displayed at the computing device to reflect the access permissions.

Another example embodiment relates to a financial institution computing system associated with a financial institution. The system includes a network interface structured to facilitate data communication via a network. The system further includes an accounts database structured to customer information associated with customers of the financial institution. The system includes a processing circuit comprising a processor and memory. The processing circuit is structured to provide access to a data control portal to a computing device associated with a customer of the financial institution. The processing circuit is further structured to receive, from the computing device, access permissions associated with the customer information that change. The access permissions define how an external device or system can access customer information associated with the customer. The processing circuit is structured to implement the access permissions, and to update a user interface of the data control portal displayed at the computing device to reflect the access permissions.

These and other features, together with the organization and manner of operation thereof, will become apparent from the following detailed description when taken in conjunction with the accompanying drawings.

DETAILED DESCRIPTION

Referring to the figures generally, systems, methods, and apparatuses for providing a customer a central location to manage permissions provided to third-parties and devices to access and use customer information maintained by a financial institution are described. The central location serves as a central portal where a customer of the financial institution can manage all access to account information and personal information stored at the financial institution. Accordingly, the customer does not need to log into each individual third-party system or customer device to manage previously provided access to the customer information or to provision new access to the customer information.

Figure 1:
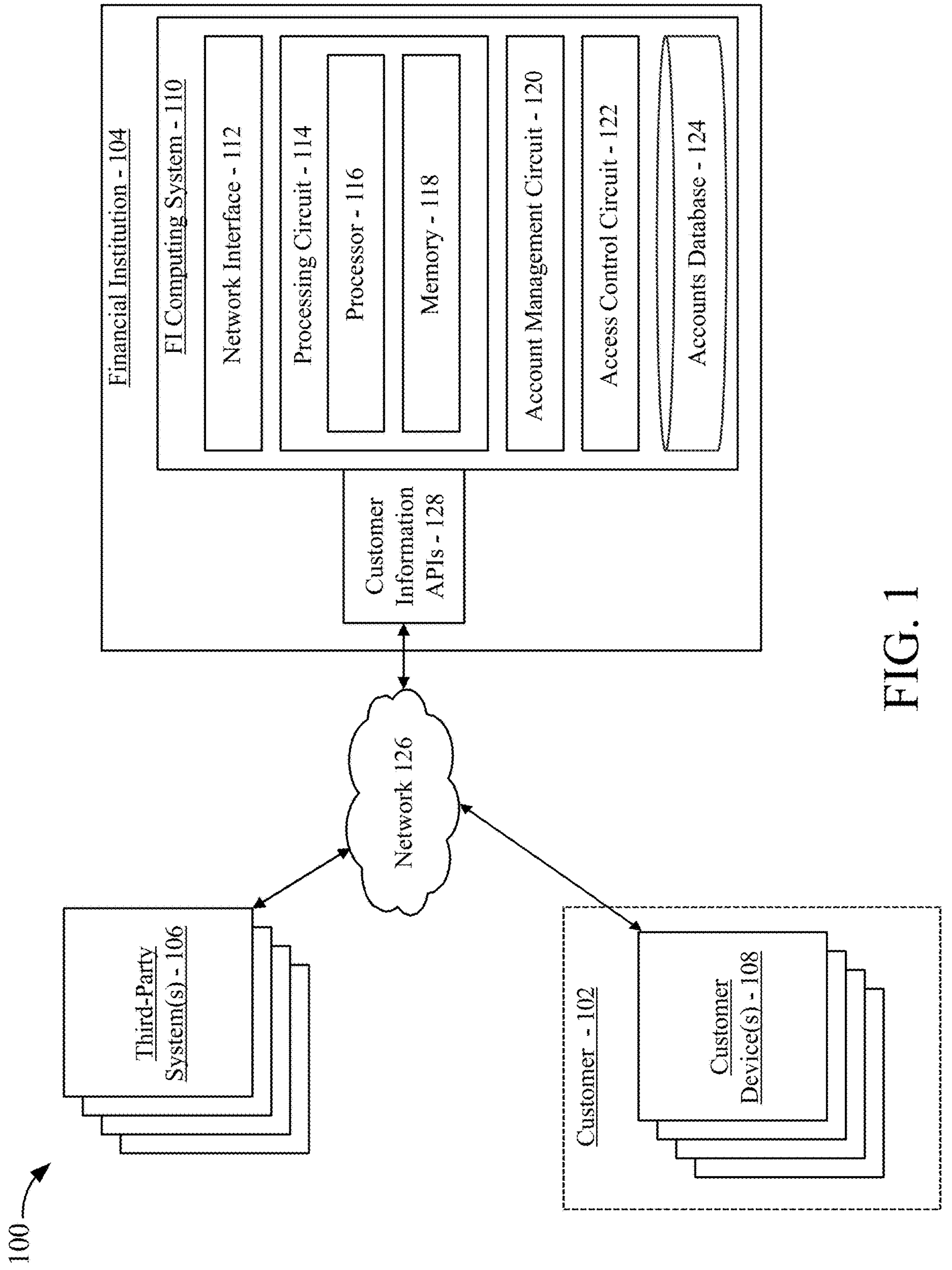
FIG. 1 is a view of a system that facilitates the sharing of customer information from a financial institution to customer devices and to third-parties according to an example embodiment.

Referring to FIG. 1, a view of a system 100 is shown according to an example embodiment. As described below in further detail, the system 100 facilitates the sharing of customer information associated with a customer 102 and maintained by a financial institution 104 to third-parties systems 106 and customer devices 108. The shared customer information can include any combination of account information associated with financial accounts held by the customer 102 with the financial institution 104 (e.g., types of accounts owned, account numbers, account balances, transaction information, bill due dates, etc.) and customer personal information stored by the financial institution 104.

The customer 102 is an account holder with the financial institution 104. The financial institution 104 includes a financial institution (FI) computing system 110. The FI computing system 110 maintains information about accounts held with the financial institution 104 and facilitates the movement of funds into and out of the accounts. Additionally, the FI computing system 110 facilitates the sharing of and the provision of access to information associated with customer accounts to the customer 102, to customer devices 108, and to third-party systems 106. The financial institution computing system 110 includes a network interface 112. The network interface 112 is structured to facilitate data communication with other computing systems (e.g., the customer devices 108, the third-party systems 106, etc.) via a network 126. The network interface 112 includes hardware and program logic that facilitates connection of the FI computing system 110 to the network 126. For example, the network interface 112 may include a wireless network transceiver (e.g., a cellular modem, a Bluetooth transceiver, a WiFi transceiver, etc.) and/or a wired network transceiver (e.g., an Ethernet transceiver). In some arrangements, the network interface 112 includes the hardware and programming logic sufficient to support communication over multiple channels of data communication (e.g., the Internet and an internal financial institution network). Further, in some arrangements, the network interface 112 is structured to encrypt data sent over the network 126 and decrypt received encrypted data.

The financial institution computing system 110 includes a processing circuit 114 having a processor 116 and memory 118. The processor 116 may be implemented as a general-purpose processor, an application specific integrated circuit (ASIC), one or more field programmable gate arrays (FPGAs), a digital signal processor (DSP), a group of processing components, or other suitable electronic processing components. The memory 118 includes one or more memory devices (e.g., RAM, NVRAM, ROM, Flash Memory, hard disk storage, etc.) that store data and/or computer code for facilitating the various processes described herein. Moreover, the memory 118 may be or include tangible, non-transient volatile memory or non-volatile memory.

The FI computing system 104 includes an account management circuit 120 and an access control circuit 122. Although shown as separate circuits in FIG. 1, in some arrangements, the account management circuit 120 and/or the access control circuit 122 are part of the processing circuit 116. Other arrangements may include more or less circuits without departing from the spirit and scope of the present disclosure. Further, some arrangements may combine the activities of one circuit with another circuit to form a single circuit. Therefore, those of ordinary skill in the art will appreciate that the present arrangement is not meant to be limiting. The account management circuit 120 is structured to perform various account management functions, including maintaining an accounts database 124, updating account balances, applying interest to accounts, processing payments related to accounts, and the like. The access control circuit 122 is structured to manage the sharing and provision of customer information to third-party systems 106 and to customer devices 108 based on permissions and preferences of the customer 102.

The FI computing system 104 includes the accounts database 124. In some arrangements, the accounts database 124 is part of the memory 118. The accounts database 124 is structured to hold, store, categorize, and otherwise serve as a repository for information associated with accounts (e.g., loan accounts, savings accounts, checking accounts, credit accounts, etc.) held by the financial institution 104. For example, the accounts database 124 may store account numbers, account balances, transaction information, account ownership information, and the like. The accounts database 124 is structured to selectively provide access to information relating to accounts at the financial institution 104 (e.g., to the customer 102 via a customer device 108).

Still referring to FIG. 1, the system 100 includes at least one third-party system 106. Each third-party system 106 is affiliated with a third-party that the customer 102 can authorize to access information associated with the customer 102 that is stored, generated, maintained, and/or controlled in part by the financial institution 104. For example, the third-party systems 106 may be affiliated with any combination of merchants (e.g., brick-and-mortar retailers, e-commerce merchants, etc.), financial health companies (e.g., investment firms, Mint®, etc.), mobile wallet systems (e.g., third-party mobile wallet systems not affiliated with or operated by the financial institution 104, mobile wallet systems affiliated with or operated by the financial institution 104), payment networks (e.g., payment networks affiliated with credit cards offered by the financial institution 104), social media networks, service providers, utility providers (e.g., electric companies, cable companies, cell phone providers, gas companies, etc.), messaging networks, personal organizers (e.g., calendar and scheduling services, bill pay services, e-mail systems, etc.), governments, or the like. Each of the third-parties may be provided access to different portions of the information associated with the customer 102 that is stored, generated, maintained, and/or controlled in part by the financial institution 104. For example, an e-commerce merchant may be provided access to payment account and billing address information, while a financial health company may be provided access to account balance information and transaction information. As described in further detail below, the customer 102 can provide a given third-party access to designated information, limit access to information, and revoke access to information through an access control portal ("access control tower") provided by the financial institution 104.

The customer 102 is associated with various customer devices 108. The customer devices 108 may include, for example, smartphones, tablet computes, laptop computers, desktop computers, wearables (e.g., smart watches, smart glasses, fitness trackers, etc.), internet of things ("IOT") devices (e.g., Amazon Echo®, smart appliances, etc.). Each of the customer devices 108 may be provided access to different portions of the information associated with the customer 102 that is stored, generated, maintained, and/or controlled in part by the financial institution 104. For example, a smartphone may be provided access to payment account and billing address information for a mobile wallet running on the smartphone, while an IOT device may be provided access to payment information, account balance information, and transaction information to execute purchases and review transactions. As described in further detail below, the customer 102 can provide a given customer device 102 access to designated information, limit access to information, and revoke access to information through the access control tower provided by the financial institution 104. In some arrangements, the customer devices 108 do not communicate with the FI computing system 110 via the network 126. For example, the customer devices 108 can include payment cards (e.g., credit cards, debit cards, smart cards, etc.) that have account information that can be linked by the FI computing system 110 to account information and customer preferences stored at the FIG. computing system 110.

The devices of the system 100 communicate via the network 126. The network 126 may include any combination of the Internet and an internal private network (e.g., a private network maintained by the financial institution 104). Through data communication over the network 126, the FI computing system 110 can share customer information with the third-party systems 106 and the customer devices 108. The FI computing system 110 includes customer information APIs 128 that define how the FI computing system 110 communicates customer information with the third-party systems 106 and the customer devices 108. The APIs facilitate the sharing of and access to the customer information stored at the FI computing system 110 based on permissions and preferences provided by the customer 102. The access control circuit 122 access to the customer information by the third-party systems 106 and the customer devices 108 via the APIs 128. In some arrangements, the FI computing system 110 provisions requested customer data to a given third-party system 106 or customer device 108 for local storage on the third-party system 106 or the customer device 108. For example, the FI computing system 110 can provision payment information, such as payment tokens associated with payment accounts, to a mobile wallet system for local storage at the mobile wallet system. In other arrangements, the FI computing system 110 provides access to remotely display, present, or analyze customer information stored at the FI computing system while the FI computing system 110 retains control over the customer information. For example, the FI computing system 110 can provide access to a financial health system to present designated customer account information through a financial health website, such as balances, transaction information, and the like, when the financial health system requests the information, without directly transmitting the data to the financial health system.

Generally, through the system 100, the customer 102 can provision access to customer information to third-party systems 106 and to customer devices 108 (e.g., by permitting the third-party system 106 or the customer device 108 to communicate with the FI computing system 110 to retrieve the customer information). The customer information is maintained by the financial institution 104 via the FI computing system 110. The customer information can include any information associated with the customer 102 that is generated by or maintained by the financial institution 104, including customer account information (e.g., account numbers, billing address, balance information, transaction information, account type information, etc.) and personal information (e.g., date of birth, social security number, tax identifications, addresses, phone numbers, e-mail addresses, aliases, etc.). The customer 102 can provision access to the customer information through the third-party, the customer device 108, or via the FI computing system data control tower. Additionally, the customer 102 can manage all previously provided access permissions via the data control tower to change an access level, set permissions, revoke access, or the like. The provision of the customer information can be managed on an account level (e.g., managing all third-party and device access to a specific account) or on a channel level (e.g., managing all the information that a given customer device 108 or third-party system 106 can access). The operation of the system 100 is described in further detail below with respect to FIGS. 2 through 5.

Figure 2:
FIG. 2 is a view of a flow diagram of a method of managing access to customer information maintained by a financial institution according to an example embodiment.
Figure 2:
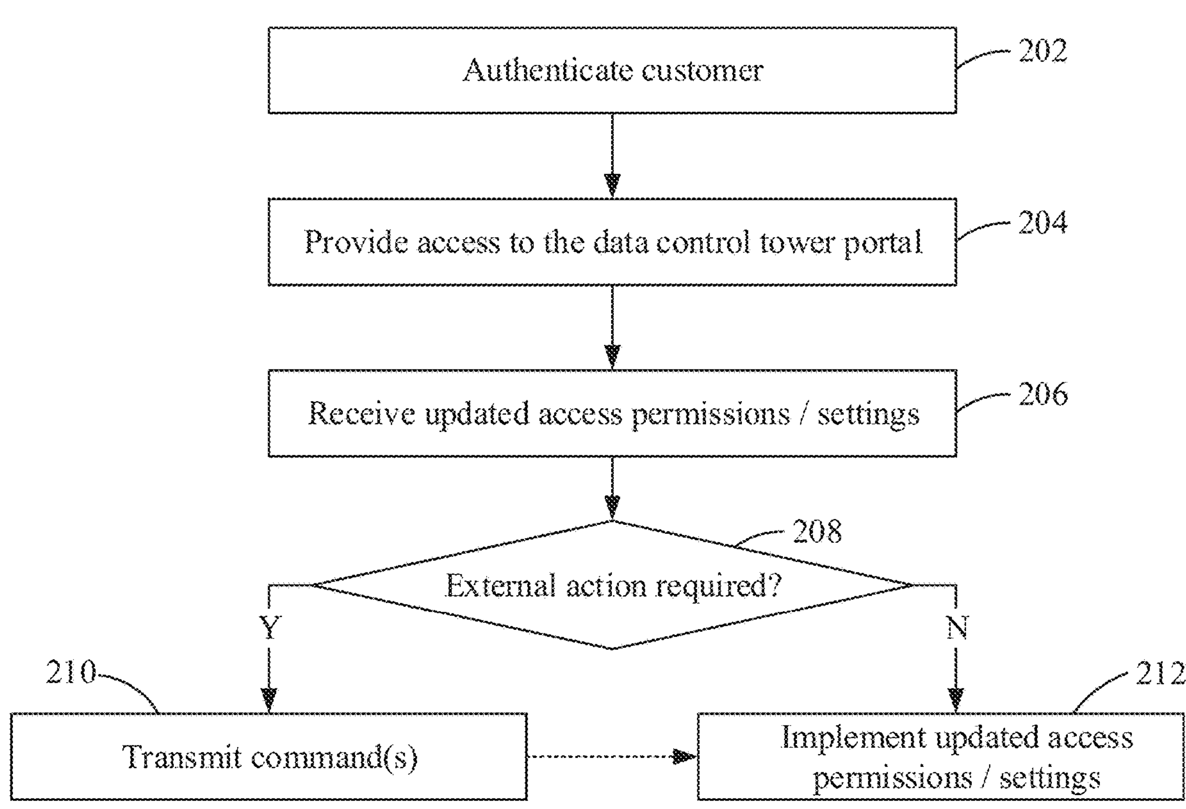

Referring to FIG. 2, a flow diagram of a method 200 of managing access to customer information maintained the by the financial institution 104 is shown according to an example embodiment. The method 200 is performed by the FI computing system 110 (e.g., by the access control circuit 122, by the processor 116, etc.).

The method 200 begins when a customer is authenticated at 202. The FI computing system 110 receives an authentication request from the customer 102 via a computing device associated with the customer (e.g., a smartphone via a mobile banking application, a computing device via a web-based banking portal, etc.). In an alternate arrangement, the request may be received via an ATM associated with the financial institution 104. The authentication request indicates that an individual purporting to be the customer 102 is attempting to access the access control tower to manage access to the customer information associated with the customer 102. The authentication request includes customer authentication information (e.g., username, password, biometric, debit card dip in an ATM, PIN, etc.). Based on the customer authentication information, the request is either granted or denied. If the request is denied, step 202 of the method 200 does not occur, and the method 200 ends. The description of the method 200 continues for situations in which the customer 102 is authenticated.

Figure 3:
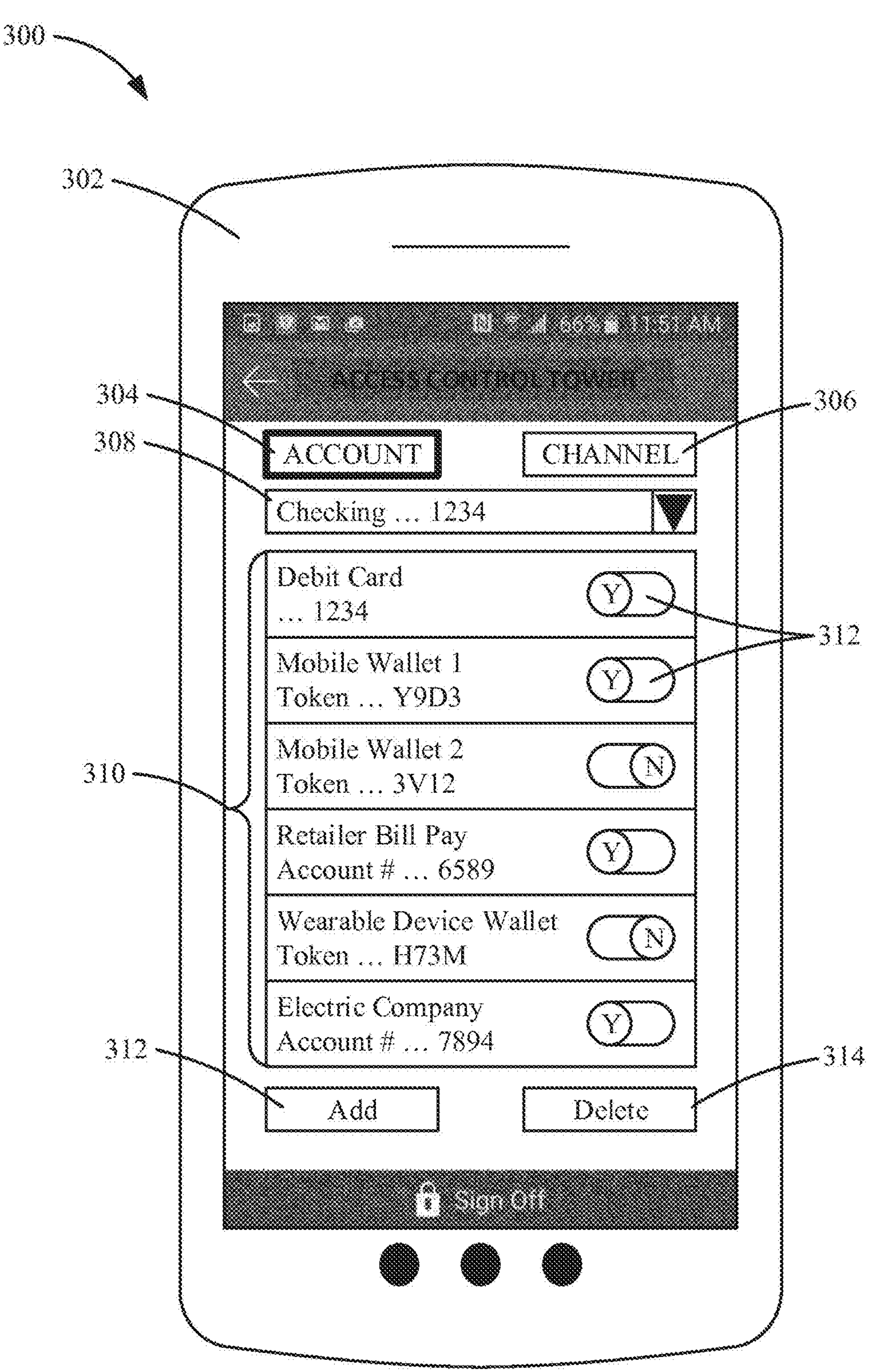
FIGS. 3 through 5 each show example data control tower user interfaces according to example embodiments.
Figure 4:
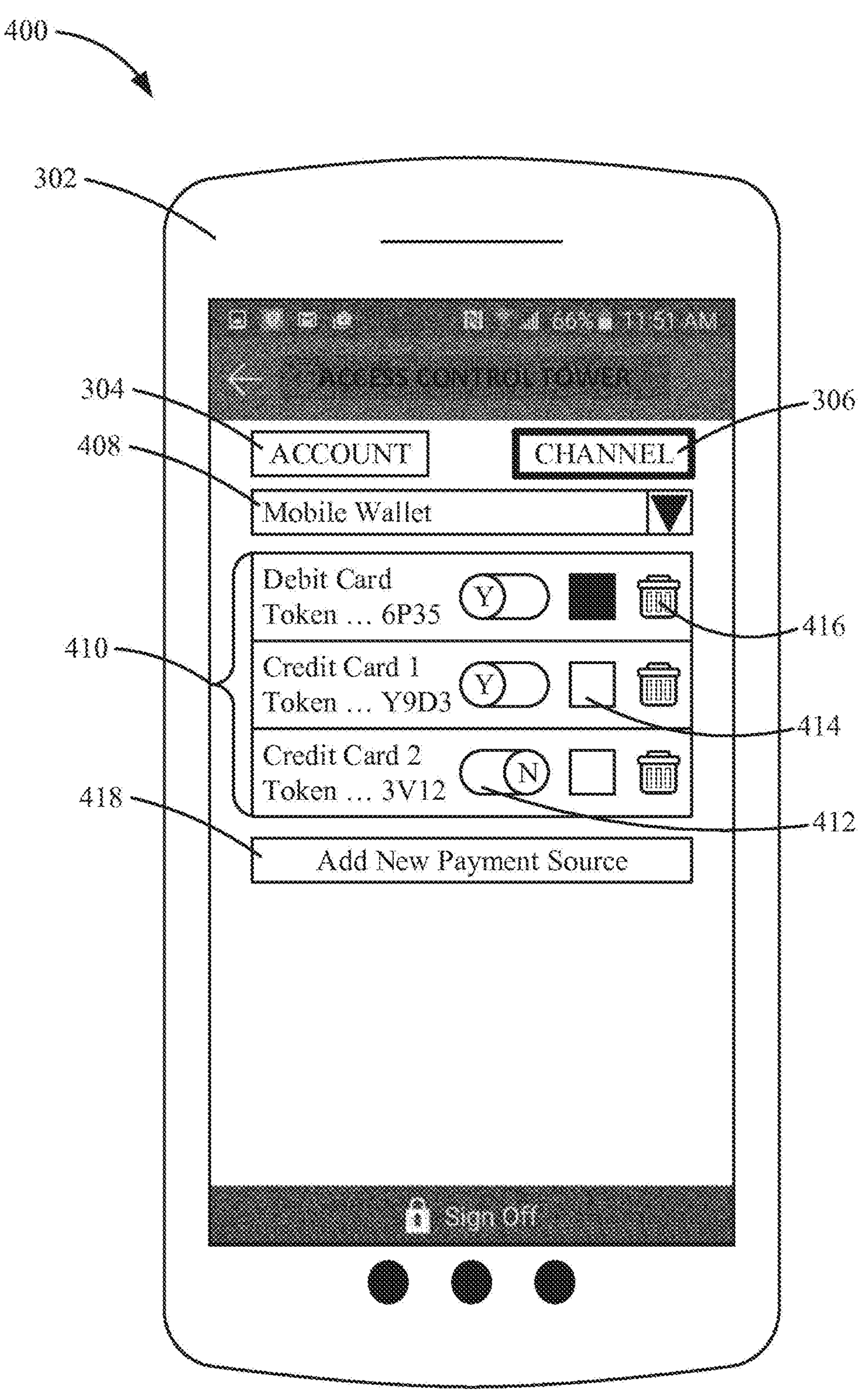
Figure 5:
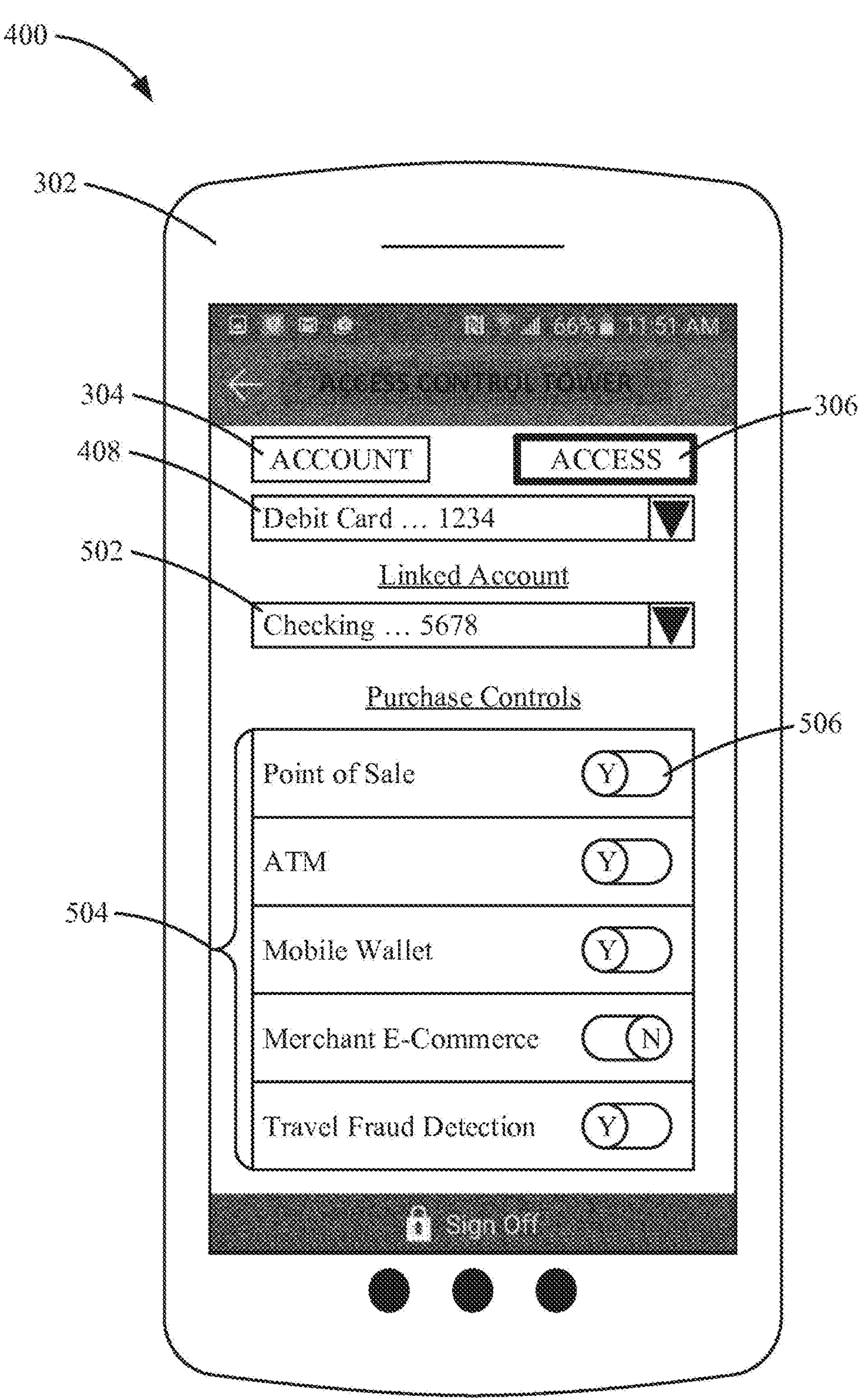

Access to the data control tower portal is provided at 204. After the customer 102 is authenticated, the FI computing system 110 provides the customer 102 access to the data control tower portal. The access to the data control tower portal may be facilitated through a computing device associated with the customer (e.g., a smartphone via a mobile banking application, a computing device via a web-based banking portal, etc.). The computing device presents interactive graphical user interfaces to the customer 102 through which the customer 102 can manage the access controls for the customer information. The data control tower portal may be part of a mobile banking application or a remote banking website associated with the financial institution 104. As noted above, the access to the customer information can be managed on an account level (e.g., managing all third-party and device access to a specific account) and on a channel level (e.g., managing all the information that a given customer device 108 or third-party system 106 can access). FIGS. 3 through 5 show example user interfaces associated with the data control tower that demonstrate various management features of the data control tower.

Referring to FIG. 3, a data control tower user interface 300 is shown according to an example embodiment. The user interface 300 is shown as a displayed on a mobile device 302. The user interface 300 includes an account toggle 304 and a channel toggle 306. As shown by the bolded outline of the account toggle 304, the account toggle 304 is selected. Accordingly, the user interface 300 is an account level management user interface. While in the account level management user interface, the customer 102 can select an account held with the financial institution 104 via the drop down box 308. As shown in FIG. 3, the customer 102 has selected a checking account. After selecting a specific account, a listing 310 of connected account access channels is populated. The listing 310 identifies each channel that the customer 102 has previously configured to access the checking account. Each entry in the listing 310 identifies a specific channel (e.g., a debit card, mobile wallet 1, mobile wallet 2, etc.), a channel access mechanism (e.g., a debit card number, a token identifier, an account number, etc.), and whether the channel access is currently active or inactive via a slider toggle 312 (where "Y" means the channel is active, and "N" means the channel is inactive). A channel may be a customer device 108 (e.g., a wearable device, a payment card, etc.) or a third-party system 106 (e.g., a mobile wallet, a retailer bill pay system, a utility company system, etc.).

The customer 102 can interact with a given slider toggle 312 to activate or deactivate a given channel's access to the selected account. For example, as shown in the user interface 300, the debit card is active (as shown by the associated slider toggle 312 being in the "Y" position). Accordingly, when the customer 102 attempts to use the debit card to make a payment (e.g., a purchase with a merchant) or withdraw cash from an ATM, the debit card is linked to the checking account identified in the drop down box 308, and the payment can go through or funds can be withdrawn (assuming the checking account has the appropriate balance). If the customer 102 interacts with the slider toggle 312 to deactivate the debit card's access to the checking account (e.g., by sliding the toggle 312 to the "N" position), the debit card is no longer linked to the checking account. If the sliding toggle 312 is in the "N" position and the customer 102 attempts to use the debit card at a merchant point-of-sale system or an ATM, the transaction will be denied or not processed from the checking account.

The user interface 300 also includes an add button 312 and a delete button 314. If the customer 102 interacts with the add button 312, the customer can add a new channel to the listing 310 of approved channels that are linked to the identified account. In doing so, the customer may need to register the customer device 108 (e.g., by providing a device identifier, by providing a primary account number of a payment card, by logging into an application or website via the customer device 108, etc.) or the third-party system 106 (e.g., by logging into a third-party website or application associated with the third-party system 106) with the financial institution 104 to pair the channel with the FI computing system 110. If the customer 102 interacts with the delete button 314, the customer 102 can select a channel in the listing 310 to revoke access of the selected channel to the account.

Referring to FIG. 4, a data control tower user interface 400 is shown according to an example embodiment. The user interface 400 is similar to the user interface 300. As such, like numbering is used between FIGS. 3 and 4 to designate like components of the user interfaces 300 and 400. The user interface 400 is shown as a displayed on the mobile device 302. As with the user interface 300, the user interface 400 includes the account toggle 304 and the channel toggle 306. As shown by the bolded outline of the channel toggle 306, the channel toggle 306 is selected. Accordingly, the user interface 400 is a channel level management user interface. While in the channel level management user interface, the customer 102 can select a channel that is paired with the financial institution 104 via the drop down box 408. A channel may be a customer device 108 (e.g., a wearable device, a payment card, etc.) or a third-party system 106 (e.g., a mobile wallet, a retailer bill pay system, a utility company system, etc.). As shown in FIG. 4, the customer 102 has selected a mobile wallet as the channel to manage. After selecting a specific channel, a listing 410 of accounts associated with the channel is populated. The listing 410 identifies each account that that the customer 102 has previously configured to be accessed by the selected channel. Each entry in the listing 410 identifies a specific account (e.g., a debit card, a credit card, etc.), an account access mechanism (e.g., a payment token), and whether the account is currently active or inactive via a slider toggle 412 (where "Y" means the account is active, and "N" means the account is inactive).

The customer 102 can interact with a given slider toggle 412 to activate or deactivate the selected channel's access to an account associated with the slider toggle 412. For example, as shown in the user interface 400, the token associated with credit card 1 is active (as shown by the associated slider toggle 412 being in the "Y" position). Accordingly, when the customer 102 attempts to make a payment with the mobile wallet (e.g., a purchase with a merchant) credit card 1 is listed as an option for the payment source of the transaction. If the customer 102 interacts with the slider toggle 412 to deactivate the channel's access to the token associated with credit card 1 (e.g., by sliding the toggle 412 to the "N" position), the credit card 1 is no longer listed as a payment source in the mobile wallet (or is listed as an unavailable payment source).

Each entry in the listing 410 also includes a default payment indicator 414 and a delete payment button 416. The default payment indicator 414 is highlighted to indicate the default payment source of the mobile wallet. As shown in FIG. 4, the selected default payment method for the mobile wallet is the debit card. If the customer 102 interacts with the default payment indicator 414 of a different entry (e.g., credit card 1 or credit card 2), the customer 102 can change the default payment source for the mobile wallet even though the customer is not interacting directly with the mobile wallet. If the customer 102 interacts with the delete payment button 416 for a given entry, the customer 102 can remove the associated payment source from the mobile wallet.

Still referring to FIG. 4, the user interface 400 also includes an add new payment source button 418. If the customer 102 interacts with the add new payment source button 418, the customer 102 can provision a payment token associated with a new payment source to the mobile wallet. The customer 102 can manually input the payment card information (e.g., primary account number, expiration date, billing address, card security code, card verification value, etc.) or select a payment card that the customer 102 has that is associated with (i.e., issued by) the financial institution 104. When the payment card information is provided by the customer 102, the FI computing system 110 can automatically request a payment card token (e.g., from a payment network associated with the payment card) and transmit the payment card token to the mobile wallet system (e.g., a third-party system 106 associated with the mobile wallet) such that the payment card is provisioned to the mobile wallet.

Referring to FIG. 5, a data control tower user interface 500 is shown according to an example embodiment. The user interface 500 is similar to the user interfaces 300 and 400. As such, like numbering is used between FIGS. 3 through 5 to designate like components of the user interfaces 300, 400, and 500. The user interface 500 is shown as a displayed on the mobile device 302. As with the user interfaces 300 and 400, the user interface 500 includes the account toggle 304 and the channel toggle 306. As shown by the bolded outline of the channel toggle 306, the channel toggle 306 is selected. Accordingly, the user interface 500 is a channel level management user interface. While in the channel level management user interface, the customer 102 can select a channel that is paired with the financial institution 104 via the drop down box 408. As shown in FIG. 5, the customer 102 has selected a debit card as the channel to manage. The debit card channel of FIG. 5 has different manageable features than the mobile wallet of FIG. 4. Accordingly, the specific channel level management user interfaces presented to the customer 102 while accessing the access control tower portal may differ depending on the channel selected by the user.

The debit card specific user interface 500 includes a linked account drop down box 502. The linked account drop down box 502 allows the customer 102 to change the account associated with the selected debit card. As shown in FIG. 5, the debit card is currently linked to a checking account ending in "5678". If the customer 102 has additional demand deposit accounts with the financial institution 104, the customer 102 selects a different account to associate the debit card with via the drop down box 502.

Additionally, the user interface 500 includes a plurality of different purchase controls 504. Each of the purchase controls 504 includes a toggle slider 506 that allows the customer 102 to activate or deactivate a particular control associated with the debit card (where "Y" means the feature is active, and "N" means the feature is inactive). The purchase controls 504 may include a point of sale control that either permits or blocks the debit card from being used at a merchant point of sale system, an ATM control that either permits or blocks the debit card from being used at an ATM, a mobile wallet control that either permits or blocks the debit card from being used in a mobile wallet, a merchant e-commerce control that either permits or blocks the debit card from being stored at a merchant e-commerce site as a stored payment method, a travel fraud detection control that turns on or off a fraud detection feature, and the like. The customer 102 can interact with a given toggle slider 506 to activate or deactivate the associated purchase control 504. The available purchase controls may vary by channel.

Referring again to FIG. 2 and the method 200, updated access permissions or settings are received at 206. The FIG. computing system 110 receives the updated access permissions or settings from the customer 102 via the access control tower portal (e.g., from a computing device that the customer 102 is using to access the access control tower portal). The updated access permissions or settings may relate to any change to access permissions or settings for a specific account held by the customer 102 with the financial institution 104 or for a specific information access channel being registered with or that has already been registered with the financial institution 104. For example, the updated access permissions or settings may relate to any of the updated access permissions or settings that are described above with respect to FIGS. 3 through 5.

The FI computing system 110 determines if external action is required to implement the updated access permissions or settings at 208. In some arrangements, the type of access permission or setting being updated requires that the FI computing system 110 transmits commands to a customer device 108 or to a third-party system 106 to implement the updated access permissions or settings. For example, if the updated access permission or setting relates to revoking or provisioning a payment token stored on a customer device 108, the FI computing system 110 may need to send a command to either (1) deactivate or remove the payment token from the customer device 108 or the third-party systems 106 affiliated with the mobile wallet (e.g., a third-party mobile wallet server, a payment network server that manages a token vault associated with the payment token, etc.) or (2) activate or provision the token to the mobile wallet via the customer device 108 and/or the third-party systems 106. In other arrangements, the type of access permission or setting being updated can be performed at the FI computing system 110 without additional commands sent to a customer device 108 or a third-party system 106. For example, if the updated access permission or setting relates to revoking a third-party's access to account balance information, the FI computing system 110 can perform an internal update at the FI computing system 110 adjusting the API permissions associated with the third-party without the need to send a command to the third-party system 106 associated with the affected third-party.

If external action is required, commands are transmitted to the appropriate recipient at 210. The FI computing system 110 transmits the update commands to the appropriate third-party systems 106 and/or customer devices 108. If no external action is required, the updated access permissions or settings are implemented at 212. The FI computing system 110 updates internal account access permissions or settings in the accounts database 124. Additionally, in some arrangements, the update to the account access permissions or settings requires both external and internal action. In such arrangements, both steps 210 and 212 are performed. Based on the updated settings and permissions, the FI computing system 110 facilitates the sharing (or denial of requests to access) customer information to the external systems (e.g., customer devices 108 and third-party systems 106).

The above-described authentication systems and methods provide for more secure transactions and more secure computer access systems. The systems and methods utilize location information related to a user device associated with a user involved with a transaction or login attempt. The location information may be packaged as a digital fingerprint, which can only be recreated by the specific user device associated with the user. Accordingly, the digital fingerprint is difficult—if not impossible—to spoof by a fraudster or by another device associated with the fraudster.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of changing accessibility of accounts administered by a financial institution computing system comprising one or more processors, the method comprising:

receiving, by the financial institution computing system, a first selection to disable a first third-party account from accessing a financial account of a user;

configuring, by the financial institution computing system, in response to the first selection, a first application programming interface (API) to disallow access to the financial account by the first third-party account, wherein configuring the first API comprises updating, by the financial institution computing system, in response to the first selection, a permission for the first API via which a first external device or system accesses the financial account for the first third-party account;

receiving, by the financial institution computing system, from the first external device or system via the first API, a first request to access the financial account;

transmitting, by the financial institution computing system, to the first external device or system via the first API, based on the updated permission, a denial of the first request received via the first API from the first external device or system;

receiving, by the financial institution computing system, a second selection to enable a second third-party account to access the financial account;

provisioning, by the financial institution computing system responsive to the second selection, an account access token that corresponds to the financial account, the second third-party account, and a second external device or system corresponding to the second third-party account;

receiving, by the financial institution computing system, from the second external device or system via the first API or a second API, a second request to access the financial account using the account access token; and transmitting, by the financial institution computing system, to the second external device or system via the first API or the second API, based on the account access token, account data corresponding to the financial account in response to the second request.

2. The method of claim 1, further comprising transmitting, by the financial institution computing system, to a computing device of the user, an identification that the financial account of the user is accessible to the first third-party account and inaccessible to the second third-party account for display by the computing device.

3. The method of claim 1, further comprising displaying, via a graphical user interface of a computing device of the user, a listing comprising (i) the first third-party account that is administered by the first external device or system, (ii) a first indication that the financial account is accessible to the first third-party account, (iii) the second third-party account that is administered by the second external device or system, and (iv) a second indication that the financial account is inaccessible to the second third-party account.

4. The method of claim 1, further comprising displaying, via a graphical user interface of a computing device of the user, a first toggle state corresponding to the first third-party account, and a second toggle state corresponding to the second third-party account, wherein a first toggle in the first toggle state visually indicates that the financial account of the user is accessible to the first third-party account, and a second toggle in the second toggle state visually indicates that the financial account is inaccessible to the second third-party account.

5. The method of claim 4, wherein the first selection is detected via the first toggle and the second selection is detected via the second toggle.

6. The method of claim 4, further comprising updating the first toggle to visually indicate that the financial account is not accessible to the first third-party account in response to the first selection, and updating the second toggle to visually indicate that the financial account is accessible to the second third-party account in response to the second selection.

7. The method of claim 1, further comprising:
receiving, by the financial institution computing system from the second external device or system via the first API or the second API, prior to the first selection, a third request to access the financial account; and
transmitting, by the financial institution computing system, to the second external device or system via the first API or the second API, account data corresponding to the financial account in response to the third request.

8. The method of claim 1, further comprising:
receiving, by the financial institution computing system, a third selection to enable access by the first third-party account to the financial account; and
transmitting, by the financial institution computing system, and in response to the third selection, a command to the first external device or system to add a second account access token associated with the financial account to a mobile wallet in order to add the financial account to the mobile wallet.

9. The method of claim 8, wherein the financial institution computing system is associated with a financial institution, and wherein the mobile wallet is not operated by the financial institution.

10. The method of claim 8, further comprising:
receiving, by the financial institution computing system, a fourth selection to disable access by the first third-party account to the financial account; and
transmitting, by the financial institution computing system, and in response to the fourth selection, a second command to the first external device or system to remove the second account access token associated with the financial account from the mobile wallet in order to remove the financial account from the mobile wallet.

11. The method of claim 1, further comprising applying, based on the first selection and the second selection, purchase controls to a payment card associated with the financial account, wherein the purchase controls prevent the payment card from being used at one or both of an automated teller machine or a merchant point of sale.

12. The method of claim 1, further comprising:
receiving, by the financial institution computing system, a third selection to enable access by the first third-party account to the financial account; and
configuring, by the financial institution computing system, the first API to communicate with the first external device or system and permit the first external device or system to access the financial account.

13. A financial institution computing system comprising one or more processors configured to:
receive a first selection to disable a first third-party account from accessing a financial account of a user;
configure, in response to the first selection, a first application programming interface (API) to disallow access to the financial account by the first third-party account, wherein configuring the first API comprises updating, by the financial institution computing system, in response to the first selection, a permission for the first API via which a first external device or system accesses the financial account for the first third-party account;
receive, from the first external device or system via the first API, a first request to access the financial account;
transmit, to the first external device or system via the first API, based on the updated permission, a denial of the first request received via the first API from the first external device or system;
receive a second selection to enable a second third-party account to access the financial account;
provision, responsive to the second selection, an account access token that corresponds to the financial account, the second third-party account, and a second external device or system corresponding to the second third-party account;
receive, from the second external device or system via the first API or a second API, a second request to access the financial account using the account access token; and
transmit, to the second external device or system via the first API or the second API, based on the account access token, account data corresponding to the financial account in response to the second request.

14. The financial institution computing system of claim 13, the one or more processors further configured to transmit, to a computing device of the user, an identification that the financial account of the user is accessible to the first third-party account and inaccessible to the second third-party account for display by the computing device.

15. The financial institution computing system of claim 13, the one or more processors further configured to:
receive, from the second external device or system via the first API or the second API, prior to the first selection, a third request to access the financial account; and
transmit, to the second external device or system via the first API or the second API, account data corresponding to the financial account in response to the third request.

16. The financial institution computing system of claim 13, the one or more processors further configured to:
receive a third selection to enable access by the first third-party account to the financial account; and
transmit, in response to the third selection, a command to the first external device or system to add a second account access token associated with the financial account to a mobile wallet in order to add the financial account to the mobile wallet.

17. The financial institution computing system of claim 16, the one or more processors further configured to:
receive a fourth selection to disable access by the first third-party account to the financial account; and
transmit, in response to the fourth selection, a second command to the first external device or system to remove the second account access token associated with the financial account from the mobile wallet in order to remove the financial account from the mobile wallet.

18. The financial institution computing system of claim 13, the one or more processors further configured to apply, based on the first selection and the second selection, purchase controls to a payment card associated with the financial account, wherein the purchase controls prevent the payment card from being used at one or both of an automated teller machine or a merchant point of sale.

19. The financial institution computing system of claim 13, the one or more processors further configured to:
receive a third selection to enable access by the first third-party account to the financial account; and
configure the first API to communicate with the first external device or system and permit the first external device or system to access the financial account.

20. A non-transitory computer-readable storage medium comprising instructions executable by one or more processors to:

receive a first selection to disable a first third-party account from accessing a financial account of a user;

configure, in response to the first selection, a first application programming interface (API) to disallow access to the financial account by the first third-party account, wherein configuring the first API comprises updating, in response to the first selection, a permission for the first API via which a first external device or system accesses the financial account for the first third-party account;

receive, from the first external device or system via the first API, a first request to access the financial account;

transmit, to the first external device or system via the first API, based on the updated permission, a denial of the first request received via the first API from the first external device or system;

receive a second selection to enable a second third-party account to access the financial account;

provision, responsive to the second selection, an account access token that corresponds to the financial account, the second third-party account, and a second external device or system corresponding to the second third-party account;

receive, from the second external device or system via the first API or a second API, a second request to access the financial account using the account access token; and transmit, to the second external device or system via the first API or the second API, based on the account access token, account data corresponding to the financial account in response to the second request.

* * * * *